United States Patent
Takeuchi et al.

(10) Patent No.: US 6,527,079 B2
(45) Date of Patent: Mar. 4, 2003

(54) CONTROL UNIT FOR AN ELECTRICAL-MOTOR-DRIVEN POWER STEERING APPARATUS

(75) Inventors: Shinji Takeuchi, Okazaki (JP); Toshihiro Takahashi, Nishio (JP); Hirotsune Suzuki, Toyokawa (JP); Hiroshi Suzuki, Okazaki (JP); Hiroaki Kato, Nukata-gun (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/819,854

(22) Filed: Mar. 29, 2001

(65) Prior Publication Data

US 2002/0033300 A1 Mar. 21, 2002

(30) Foreign Application Priority Data

Mar. 29, 2000 (JP) ........................... 2000-091393
Sep. 29, 2000 (JP) ........................... 2000-299953

(51) Int. Cl.⁷ .................................. B62D 5/04
(52) U.S. Cl. ........................... 180/443; 701/43
(58) Field of Search ................. 180/443, 446, 180/402, 403; 701/42, 41, 43

(56) References Cited

U.S. PATENT DOCUMENTS

| | | | | |
|---|---|---|---|---|
| 5,904,223 A | * | 5/1999 | Shimizu et al. | 180/443 |
| 5,996,724 A | * | 12/1999 | Shimizu et al. | 180/446 |
| 6,059,068 A | * | 5/2000 | Kato et al. | 180/402 |
| 6,097,286 A | * | 8/2000 | Discenzo | 340/465 |
| 6,148,950 A | * | 11/2000 | Mukai et al. | 180/446 |
| 6,161,068 A | * | 12/2000 | Kurishige et al. | 701/41 |
| 6,240,350 B1 | * | 5/2001 | Endo | 701/41 |

FOREIGN PATENT DOCUMENTS

| | | |
|---|---|---|
| JP | 9-58506 | 3/1997 |
| JP | 10-76968 | 3/1998 |
| JP | 11-48999 | 2/1999 |
| JP | 11-99956 | 4/1999 |

* cited by examiner

*Primary Examiner*—Lesley D. Morris
*Assistant Examiner*—Tony Winner
(74) *Attorney, Agent, or Firm*—Oblon, Spivak, McClelland, Maier & Neustadt, P.C.

(57) ABSTRACT

In a control unit for an electrical-motor-driven power steering apparatus, there are provided an assist current command value calculated based upon a steering torque of a steering wheel, an assist current control value calculated based upon a motor current value of a motor and the assist current command value. A motor outputs an assist force based upon the assist current control value. Further, the control unit provides an estimation means for estimating a road surface $\mu$ based upon at least one of the motor current value and the steering torque. To the control unit, there are further inputted a vehicle speed obtained based upon rotation of a wheel, and a steering angle obtained based upon rotation of the steering wheel. Therefore, the estimation means estimates the road surface $\mu$ by comparing with a previously memorized standard value corresponding to the vehicle speed and the steering angle.

12 Claims, 13 Drawing Sheets

FIG. 6
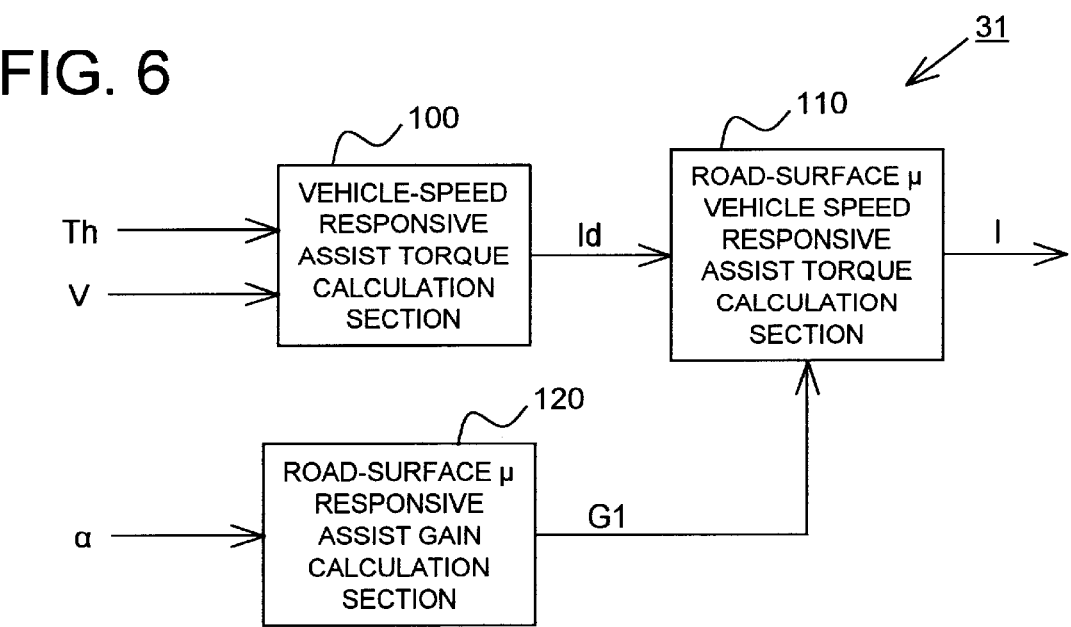
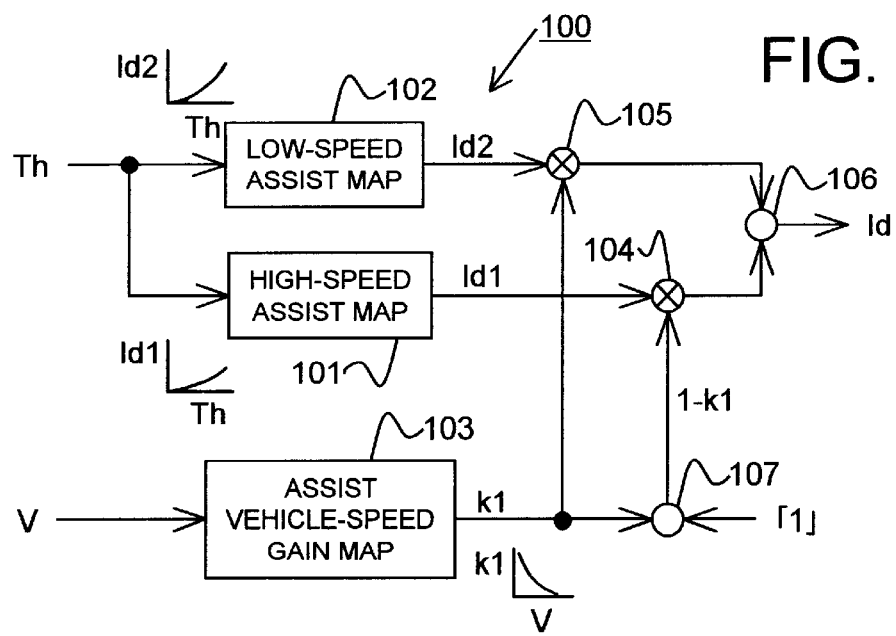
FIG. 7(A)
FIG. 7(B)
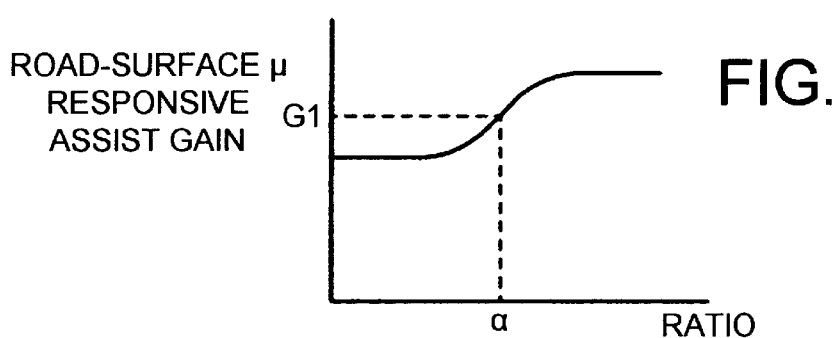

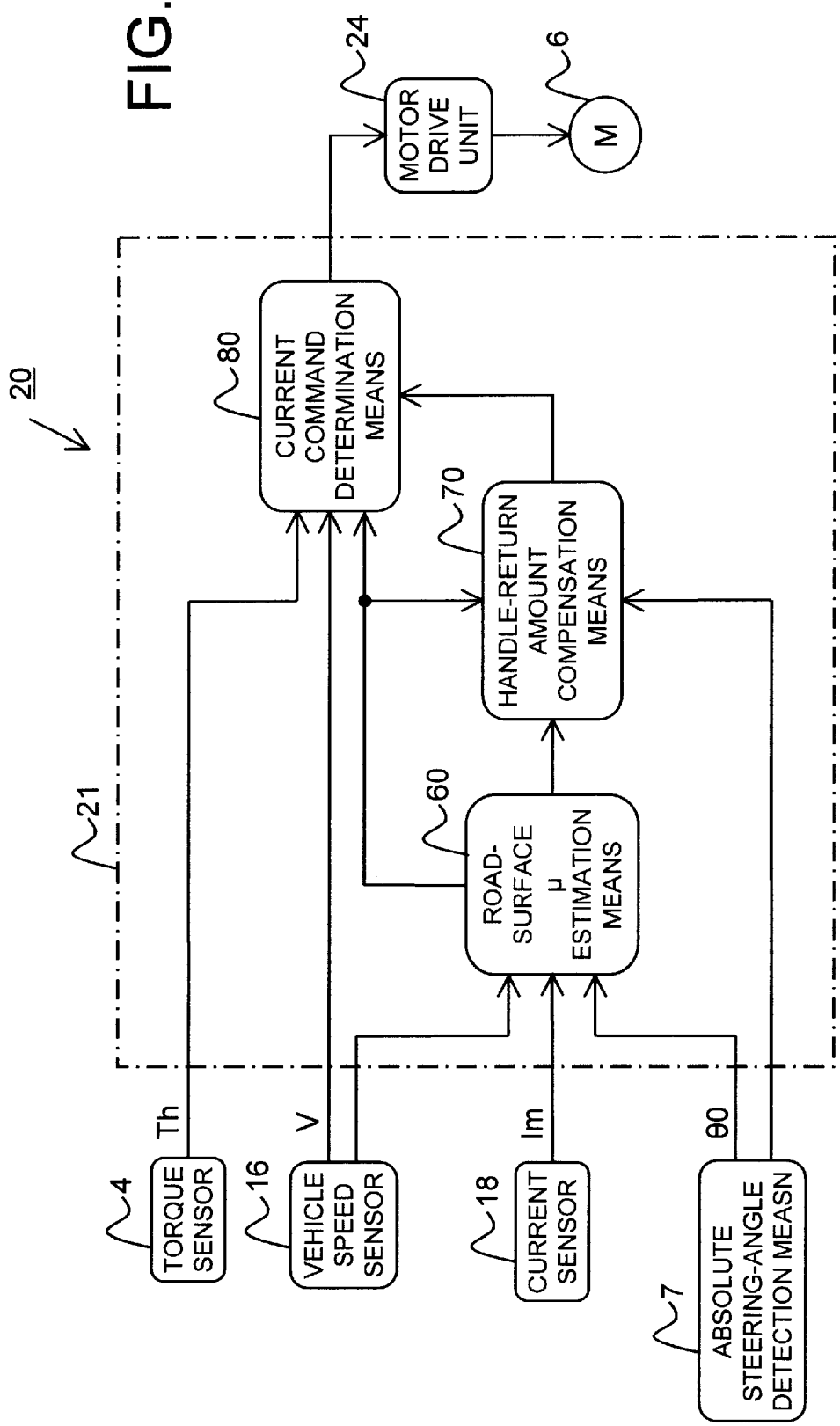

CONTROL UNIT FOR AN ELECTRICAL-MOTOR-DRIVEN POWER STEERING APPARATUS

INCORPORATION BY REFERENCE

The disclosure of Japanese Patent Application Nos. 2000-91393 filed on Mar. 29, 2000 and 2000-299953 filed on Sep. 29, 2000 including the specification, drawings and abstract are incorporated herein by reference in its entirety.

BACKGROUND OF THE INVENTION

1. Field of the Invention

The invention relates to a control unit for an electrical-motor-driven power steering apparatus used for an automotive vehicle and so on.

2. Description of the Related Art

FIG. 16 is a block diagram schematically showing a conventional control unit according to an electrical-motor-driven power steering apparatus used for an automotive vehicle and so on.

With a steering shaft 42 connected to a steering wheel 41, there is provided a torsion bar 43 to which a torque sensor 44 is secured. In a force acts on the torsion bar 43 upon rotation of the steering shaft 42, the torsion bar 43 is twisted in correspondence with the added force, and its torsion of the torsion bar 43 is detected by the torque sensor 44.

To the steering shaft 42, there is fixedly attached a reducer 45 with which a gear 47 joined with a rotational axis of a motor is engaged. Further, a pinion shaft 48 is secured to the reducer 45. At a top portion of the pinion shaft 48, there is fixed a pinion 49 with which a rack 51 is engaged.

At both ends of the rack 51, there is secured each of tie-rods 52. Each of knuckles 53 is rotatably connected to each both ends of the tie-rods 52. A front wheel 54 is fixed to the knuckle 53. Further, the knuckle 53 is rotatably connected to a cross-member 55.

Accordingly, when the motor 46 is rotated, the number of its rotation is reduced by the reducer 45 and the reduced rotation is transferred to the pinion shaft 48. Thereafter, the rotation is transferred to the rack 51 through a rack-and-pinion mechanism 50. The knuckle 53 connected to the tie-rod 52 fixed to the rack 51 moves rightward or leftward in correspondence with a rotational direction of the motor 46. Besides, a vehicle speed sensor 56 is provided on the front wheel 54.

The rotational number and direction of the motor 46 is determined by positive or negative assist current supplied from a motor drive unit 57. The assist current that the motor drive unit 57 supplies to the motor 46 is calculated by an assist current determination means 58 for controlling the motor drive unit 57. The assist current determination means 58 calculates a steering torque Th of the steering wheel 41 based upon a detection signal VT from the torque sensor 44, and a vehicle speed V based upon a detection signal from the vehicle speed sensor 56.

The assist current determination means 58 calculates the assist current based upon the calculated steering torque Th and vehicle speed V. This calculation is led from an assist map previously stored in a memory of the assist current determination means 58.

In the conventional control unit for the electrical-motor-driven power steering apparatus as constructed above, in a case that the vehicle travels on a snowed road or on a crust (eisbahn), its road-surface reaction force is small, so that the assist torque by the motor 46 becomes to excess. This phenomenon is caused by that the aforementioned assist map is set based upon a dry road. Namely, the dry road is a high-$\mu$ road having a high coefficient of friction in which the road-surface reaction force is large, so that the assist force is set corresponding to the reaction force of the high-$\mu$ road by the assist map.

In the conventional control unit of the electrical-motor-driven power steering apparatus, supplemental controls such a handle-return control and a damper control exclusive of the aforementioned assist control are executed. In these control operations, the control command value is however calculated by the standard value obtained with dry road. Due to this control operation, in a case that the vehicle travels on a snowed road or on a crust (eisbahn), the road-surface reaction is small in the supplemental control, so that there is a problem such that a stability of the steering feeling is lacked.

SUMMARY OF THE INVENTION

In a control unit for an electrical-motor-driven power steering apparatus, there are provided an assist current command value calculated based upon a steering torque of a steering wheel, an assist current control value calculated based upon a motor current value of a motor and the assist current command value. A motor outputs an assist force based upon the assist current control value. Further, the control unit provides an estimation means for estimating a road surface $\mu$ based upon at least one of the motor current value and the steering torque.

To the aforementioned control unit, there are further inputted a vehicle speed obtained based upon rotation of a wheel, and a steering angle obtained based upon rotation of the steering wheel. Therefore, the estimation means estimates the road surface $\mu$ by comparing with a previously memorized standard value corresponding to the vehicle speed and the steering angle.

Further, the estimation means is executed when the vehicle speed and the steering angle exist within a predetermined vehicle speed range and within a predetermined steering angle range, respectively. A motor control means is also provided to control the motor based upon the estimated road surface $\mu$. The road surface $\mu$ is estimated with the estimation means by executing a leveling processing taking account into the previously estimated road surface $\mu$.

In the control unit, there is further provided an abnormal detection means for judging whether the estimated road surface $\mu$ is abnormal or not.

For the abnormal detection, the control unit includes a memory storing a formal road surface $\mu$ before the abnormal detection means detects the abnormal value, so that the estimation means can alternate a present road surface $\mu$ to the road surface $\mu$ when the abnormal detection means judges that the present road surface $\mu$ is the abnormal value.

Further, the estimation means respectively estimates the road surface $\mu$ corresponding to a right-steering operation and a left-steering operation.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 6 is a control block diagram for a current command value calculation section;

FIG. 7(A) is a control block diagram for a vehicle speed responsive assist-torque calculation section;

FIG. 7(B) shows a road-surface $\mu$ responsive assist gain map;

FIG. 14 is a block diagram showing a control unit according to a second embodiment of the present invention;

DETAILED DESCRIPTION OF PREFERRED EMBODIMENTS

First Embodiment

A first embodiment of the present invention will be described hereinafter with reference to FIGS. 1–13, wherein it is embodied to a control unit for controlling an electrical-motor-driven power steering apparatus of a rack-assist type installed in an automotive vehicle.

Figure 1:
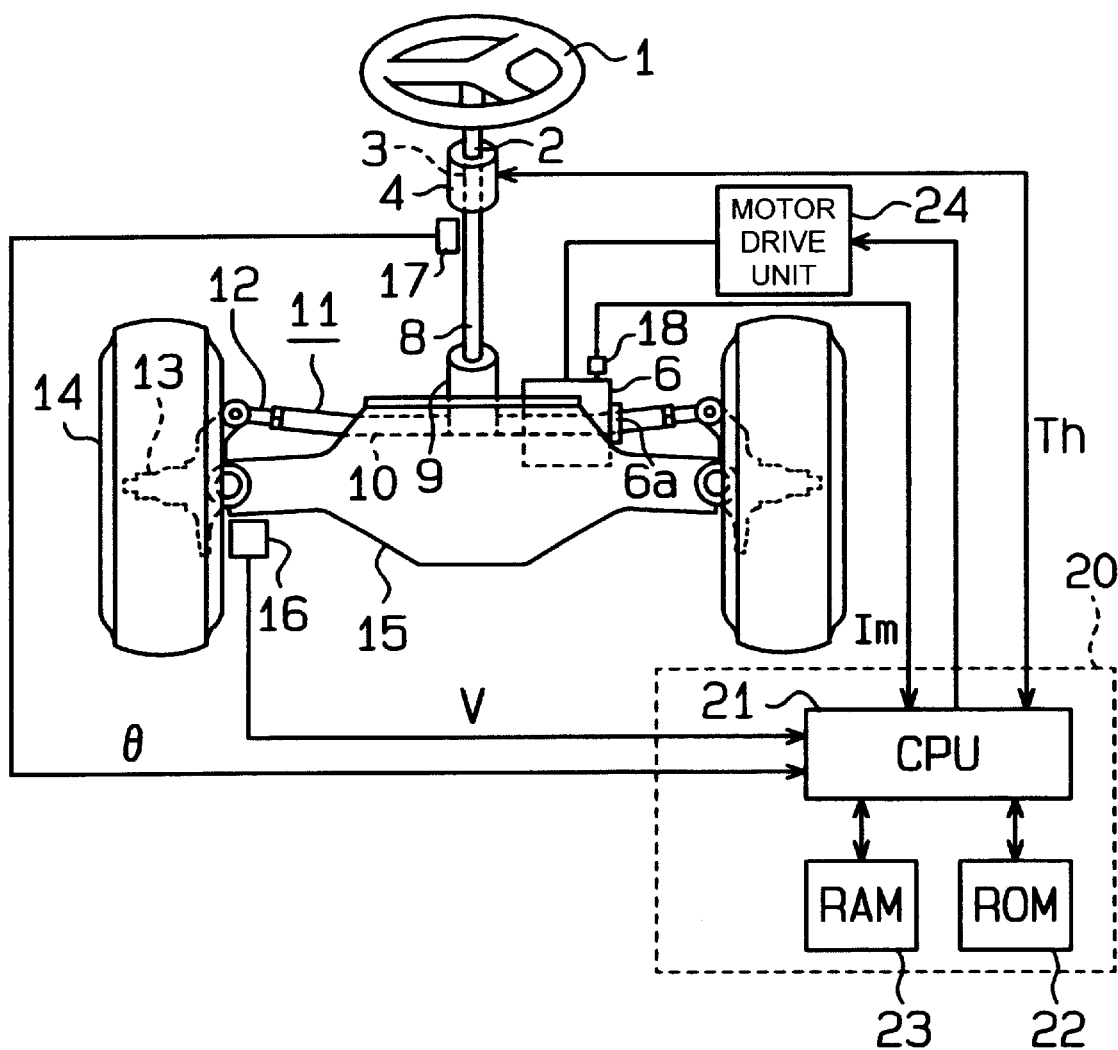
FIG. 1 is a block diagram schematically showing a control unit of an electrical-motor-driven power steering apparatus according to the present invention.

FIG. 1 is a diagram schematically showing an electrical-motor-driven power steering apparatus and a control unit 20 therefor.

A torsion bar 3 is provided with a steering shaft 2 connected to a steering wheel 1. Besides, the steering wheel 1 may be equivalently read as a handle for facility of explanation. A torque sensor 4 is disposed in the torsion bar 3. In a case that a certain force acts on the torsion bar 3 upon rotation of the steering shaft 2, the torsion bar 3 is twisted in correspondence with the added force. In such a situation, the torque sensor 4 detects the torsion of the torsion bar 3, i.e., a steering torque Th acting on the steering wheel 1. Further, a steering angle sensor 17 for detecting a steering angle θ is attached to the steering shaft 2. These outputs from the sensors are transferred to the control unit 20.

A pinion shaft 8 is fixedly attached to the steering shaft 2, to an end portion of which a pinion 9 is joined and is engaged with a rack 10. Therefore, a rack-and-pinion mechanism is achieved by the rack 10 and the pinion 9. On both end portions of the rack 10, there are tie-rods 12 fixedly provided respectively, and a knuckle 13 is rotatably connected to its top portion of the tie-rod 12. A front wheel 14 as of a tire is attached to the knuckle 13, and a cross-member 15 is rotatably secured to its one end thereof.

Further, an electrical motor 6 (referred to as a motor, hereinafter) coaxially arranged with the rack 10 transfers an assist steering force generated thereby to the rack 10 through a ball-nut mechanism 6a.

Accordingly, when the motor 6 rotates, the number of its rotation is reduced by the ball-nut mechanism 6a and transferred to the rack 10. Thereafter, a direction of the front wheels 14 provided on the knuckle 13 is changed through the tie-rod 12 by the rack 10, so that a direction of the vehicle can be changed.

On the front wheel 14, there is provided a vehicle speed sensor 16.

Next, an electrical structure for the control unit 20 of the electrical motor-driven power steering apparatus will be explained hereinafter with reference to FIG. 1.

The torque sensor 4 outputs a signal corresponding to the steering torque Th of the steering wheel 1. The steering angle sensor 17 outputs a signal corresponding to the steering angle θ of the steering shaft 2. The vehicle speed sensor 16 outputs to the control unit 20 a detection signal corresponding to the rotational number of the front wheel 14 as a vehicle speed V. Further, to the control unit 20, there is electrically connected a motor drive current sensor 18 for detecting a drive current (a motor current Im) applying to the motor 6, a signal corresponding to the motor current Im is supplied to the control unit 20 from the motor drive current sensor 18.

The control unit 20 is provided with a central processing unit (CPU) 21 as of a control means, a read only memory (ROM) 22, and a random access memory (RAM) 23 for storing various data temporarily. In the ROM 22, there is memorized various control programs that is executed in the CPU 21, which programs include road-surface $\mu$ estimation control, road-surface $\mu$ responsive assist control, road-surface $\mu$ responsive handle-return control, road-surface $\mu$ responsive damper control, road-surface $\mu$ responsive torque-inertia-compensation control and etc. In the RAM 23, there is temporarily stored calculated results after executed in the CPU 21.

The CPU 21 corresponds to an estimation means for estimating a coefficient of friction on a road surface. The CPU 21 also provides a current control section 38 described hereafter, in which a pulse width modulation (PWM) calculation is carried out so that the motor current fits an assist command current value, whereby the motor 6 is driven based upon its calculation result.

(Estimation in a Coefficient of Friction $\mu$ on Road-Surface)

Herein, estimation measures of a coefficient of friction $\mu$ on road-surface (referred to as "road-surface $\mu$" hereinafter) will be explained in this embodiment.

It is known that an reaction force of the road-surface (referred to as "road-surface reaction force" hereinafter) at a certain vehicle speed V and at a certain steering angle $\theta$ changes in accordance with the road-surface $\mu$. Accordingly, in a state of previously memorizing the road-surface reaction force at a certain vehicle speed V and at a certain steering angle $\theta$, the road-surface $\mu$ can be estimated by comparing the memorized road-surface reaction force with a calculated road-surface reaction force.

The road-surface reaction force is equal to a rack thrust force F. Therefore, the rack thrust force F in the electrical-motor-driven power steering apparatus of the rack-assist type is shown by the following equation.

$$F=Fm+Fh \qquad (A)$$

Herein, Fm is a thrust force assisted by the motor 6, and Fh is a thrust force upon operation of the handle. Further, Fm and Fh are represented by the following equations.

$$Fm=2\pi \cdot Tm \cdot \eta b/L \qquad (B)$$

$$Fh=2\pi \cdot Th \cdot \eta p/St \qquad (C)$$

Besides, Tm is a motor torque, $\eta b$ is a ball-screw efficiency of the ball-nut mechanism 6a, and L is a lead of its ball-screw. Further, Th is a steering torque, $\eta p$ is a gear efficiency of a rack-and-pinion in the rack-and-pinion mechanism, and St is a stroke ratio thereof.

Accordingly, the rack thrust force F is led by the following equation.

$$F=(Tm \cdot \eta b \cdot St/L + Th \cdot \eta p) \cdot 2\pi/St$$

Herein, since it is experimentally considered that the efficiency of $\eta b$ is equal to that of $\eta p$:

$$G(\text{reduction ratio})=St/L$$

Therefore, the following equation can be led.

$$F \approx (Tm \cdot G + Th) = f$$

Namely, the road-surface reaction force (=rack thrust force) is proportional to f.

As a result, f=Tm·G+Th is introduced as an evaluation function representing the road-surface reaction force. With this evaluation function, an evaluation function ratio $\alpha$ (=f/f0) is calculated based upon a previously memorized standard road evaluation function f0 as of a standard value on a standard road (i.e., an asphalted road in the embodiment). This evaluation function ratio $\alpha$ is of a proportional value to the road-surface $\mu$, so that calculating of the evaluation function ratio $\alpha$ corresponds to estimate the road-surface $\mu$.

(Operation of the First Embodiment)

Next, operations in the control unit 20 of the above-constructed electrical-motor-driven power steering apparatus including that of the CPU 21 will be described hereinafter with reference to flowcharts shown in FIGS. 3 and 4.

Figure 3:
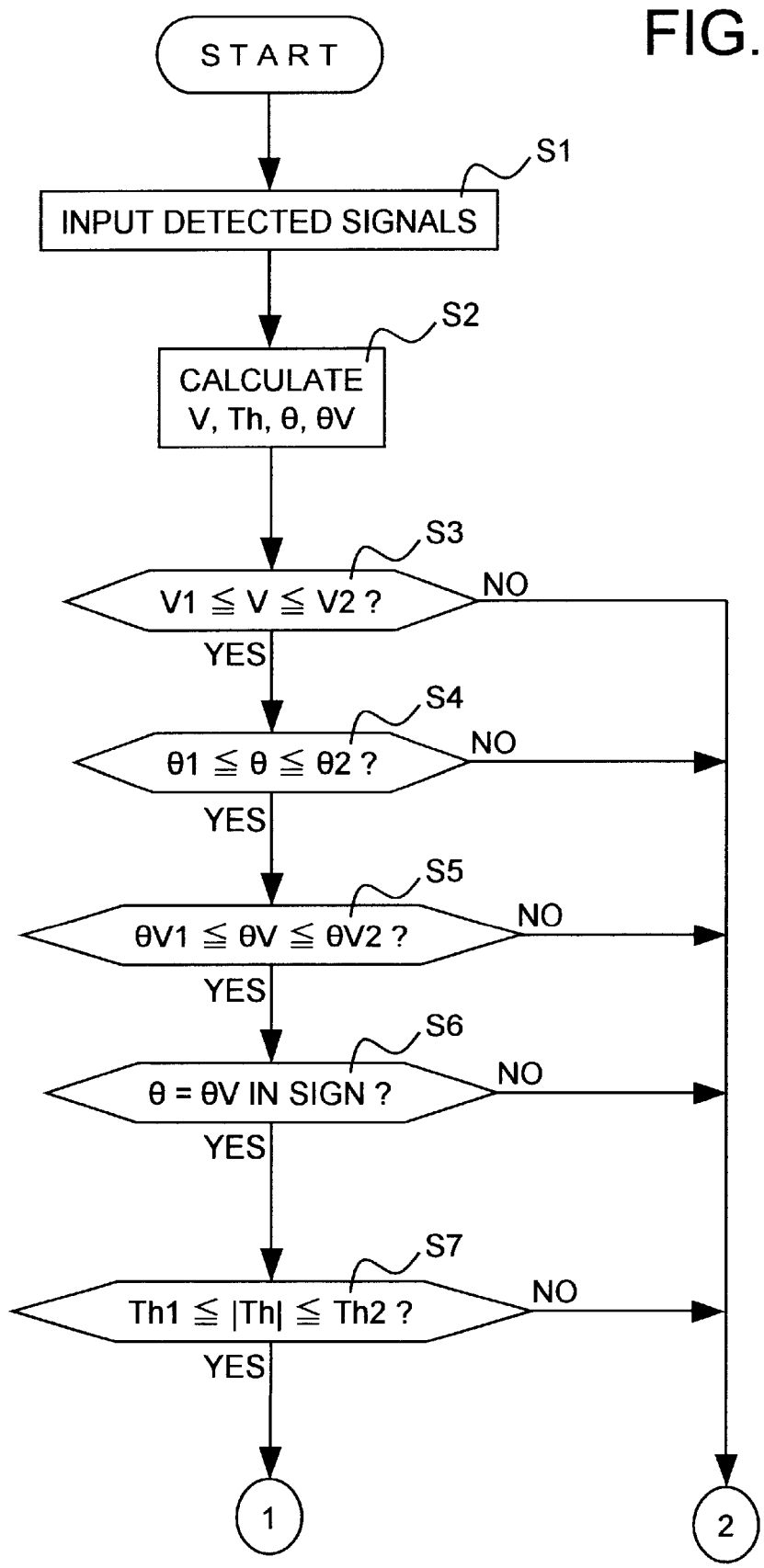
FIG. 3 is a flowchart for a road-surface $\mu$ control program.
Figure 4A:
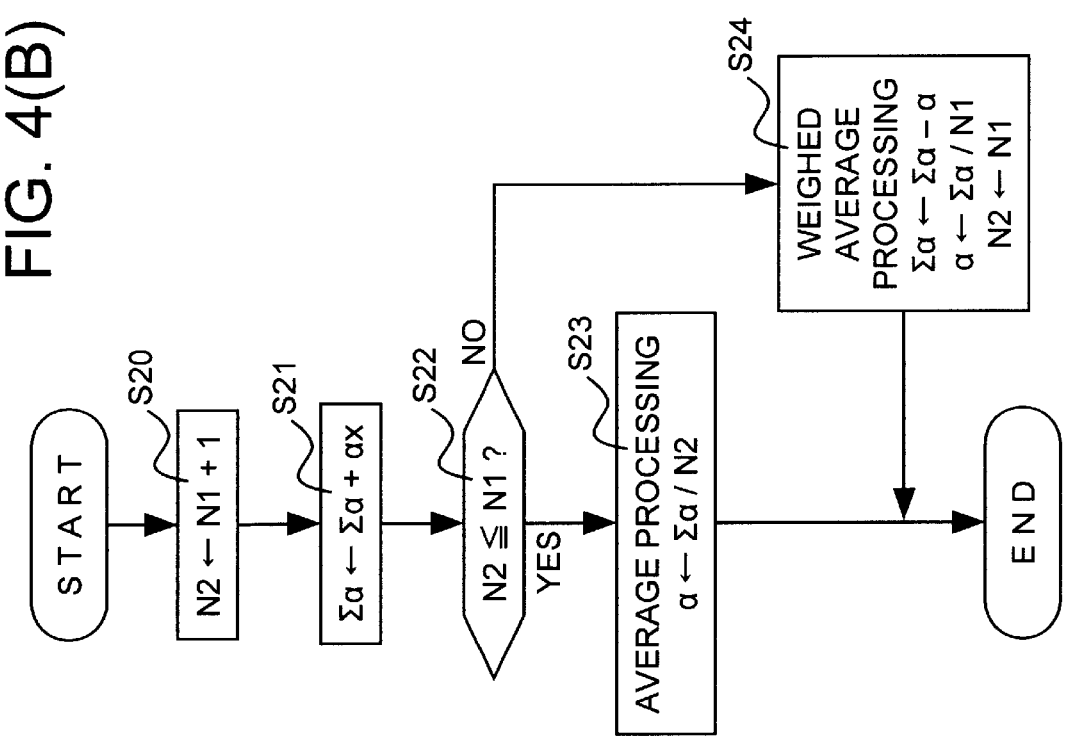
FIG. 4(A) is a flowchart subsequent to the flowchart in FIG. 3.

The flowcharts in FIGS. 3 and 4(A) show those of the road-surface $\mu$ estimation control program executed at a constant interval time (periodically).

First, the CPU 21, in step S1, reads into the RAM 23 various detected signal from the vehicle 16, torque sensor 4, steering angle sensor 17 and motor drive current sensor 18. Subsequently, the vehicle speed V and the steering torque Th of the steering wheel 1 are calculated in step S2 based upon the detected signals from the vehicle speed sensor 16 and torque sensor 4, respectively. Further, in the same step, the steering angle $\theta$ is calculated based upon the steering angle sensor 17, and the steering angular velocity $\theta V$ is calculated by differentiating the steering angle $\theta$.

In step S3, it is judged that the vehicle speed calculated in step S2 exists within a range between a lower limit value V1 of judgment vehicle speed and an upper limit value V2 thereof (V1<V<V2). This judgment is executed in order to judge whether the vehicle speed V exists within an applicable range for estimation of the road-surface $\mu$. In step S3, if the vehicle speed V exists within the applicable range from the lower limit value V1 of the judgment vehicle speed to the upper limit value V2 thereof, the control operation advances to step S4. If does not so, the processing routine is finished once.

In step S4, it is judged whether an absolute value of the steering angle $\theta$ calculated in step S2 exists within a range between a lower limit value $\theta 1$ of judgment steering angle and an upper limit value $\theta 2$ thereof ($\theta 1<\theta<\theta 2$). Since the steering angle $\theta$ has two states of a right-turn steering operation and left-turn steering operation, it is set that the right-turn steering operation is positive, and the left-turn steering operation is negative. This judgment is executed in order to judge whether the steering angle $\theta$ exists within an applicable range for estimation of the road-surface $\mu$. In step S4, if the absolute value of the steering angle $\theta$ exists within the applicable range from the lower limit value $\theta 1$ of the judgment steering angle to the upper limit value $\theta 2$ thereof, the control operation advances to step S5. If does not so, the processing routine is finished once.

In step S5, it is judged whether an absolute value of the steering angular velocity $\theta V$ calculated in step S2 exists within a range between a lower limit value $\theta V1$ of judgment steering angular velocity and an upper limit value $\theta V2$ thereof ($\theta V1<\theta<\theta V2$). Since the steering angular velocity $\theta V$ has two states of a right-turn operation of the steering wheel 1 and left-turn operation thereof, it is set that the right-turn operation of the steering wheel 1 is positive, and the left-turn operation thereof is negative. This judgment is executed in order to judge whether the steering angular velocity $\theta V$ exists within an applicable range for estimation of the road-surface $\mu$. In step S5, if the absolute value of the steering angular velocity $\theta V$ exists within the applicable range from the lower limit value $\theta V1$ of the judgment steering angular velocity to the upper limit value $\theta V2$ thereof, the control operation advances to step S6. If does not so, the processing routine is finished once.

In the next step S6, it is judged whether a sign (positive or negative) of the steering angle $\theta$ coincides or not with that of the steering angular velocity $\theta V$. For example, in a case that the steering wheel 1 is operated to any direction of right or left from a vicinity position in a straight traveling state of the vehicle, the sign of the steering angle $\theta$ coincides with that of the steering angular velocity $\theta V$. However, after the steering wheel 1 is operated once, in a case that it is returned to the vicinity position thereof, the sign of the steering angle $\theta$ is different from that of the steeling angular velocity $\theta V$.

Accordingly, in a case that the sign of the steering angle $\theta$ is same as that of the steering angular velocity $\theta V$, it is judged that the steering wheel 1 (handle) is turned, the control operation advances to step S7. In contrast, in a case that it is judged that the signs of the steering angle $\theta$ is different from that of the steering angular velocity $\theta V$, the processing routine is finished once.

In step S7, it is judged whether an absolute value of the steering torque Th calculated in step S2 exists within a range between a lower limit value Th1 of judgment steering torque and an upper limit value Th2 thereof (Th1<Th<Th2). This judgment is executed for whether the calculated steering torque Th is abnormal or not. The abnormal torque means a torque in a case that the front wheel contacts curb or that it drops into furrow. It is judged that the steering torque Th exists within this range, the control operation advances to step S8. Reversely, in a case that the steering torque Th exists out of this range, it is judged to be abnormal, and the processing routine is finished once.

In the next step S8, the motor torque Tm is calculated based upon the motor current Im. The motor torque is represented by the following equation.

$$Tm = Kt \cdot Im$$

Besides, Kt is a torque coefficient of the motor 6.

In the next step S9, an instant evaluation function f is calculated. This instant evaluation function f means an evaluation function obtained at this control cycle. The instant evaluation function f is obtained by the following equation.

$$f = Tm \cdot G + Th$$

As described above, G is the reduction ratio (coefficient).

Figure 5:
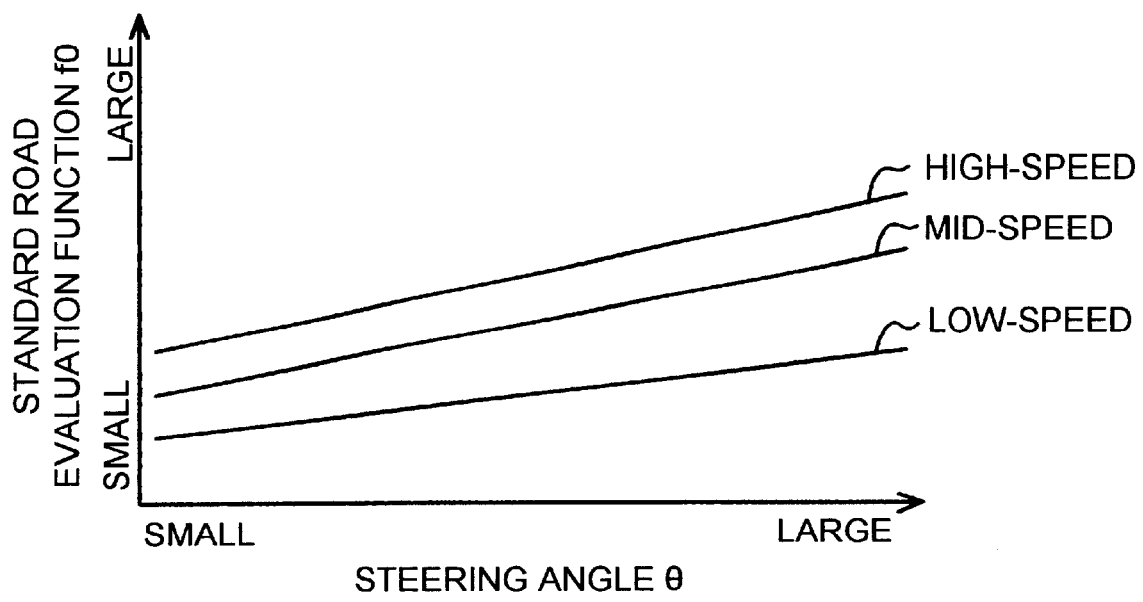
FIG. 5 shows a map for obtaining a standard road evaluation function f.

In the next step S10, the standard road evaluation function f0 is led, which is led with reference to a map shown in FIG. 5. In this map, there are provided a steering angle $\theta$ as an axis of abscissas, and a value of the standard road evaluation function as an axis of ordinates, so that this map means three-dimensional map, whereby the standard road evaluation function f0 can be selected in correspondence with various vehicle speeds V. Namely, the map is previously memorized in the ROM 22. Therefore, when the vehicle speed V and the steering angle $\theta$ are determined, the standard road evaluation function f0 can be selected thereby.

As shown in the same figure, the value of the standard road evaluation function f0 becomes large as the steering angle $\theta$ becomes large. At the same steering angle $\theta$, the value of the standard road evaluation function f0 becomes large as the vehicle speed V becomes large.

In a next step S11, an evaluation function ratio (referred to as "conditional evaluation function ratio" hereinafter) $\alpha x$ is calculated based upon the instant evaluation function f and the standard road evaluation function f0. Namely, the calculation of the conditional evaluation function ratio $\alpha x$ corresponds to the execution for calculation of an instant road-surface $\mu$.

In a subsequent step S12, a leveling process of the calculated conditional evaluation function ratio $\alpha x$ is executed.

Figure 4B:
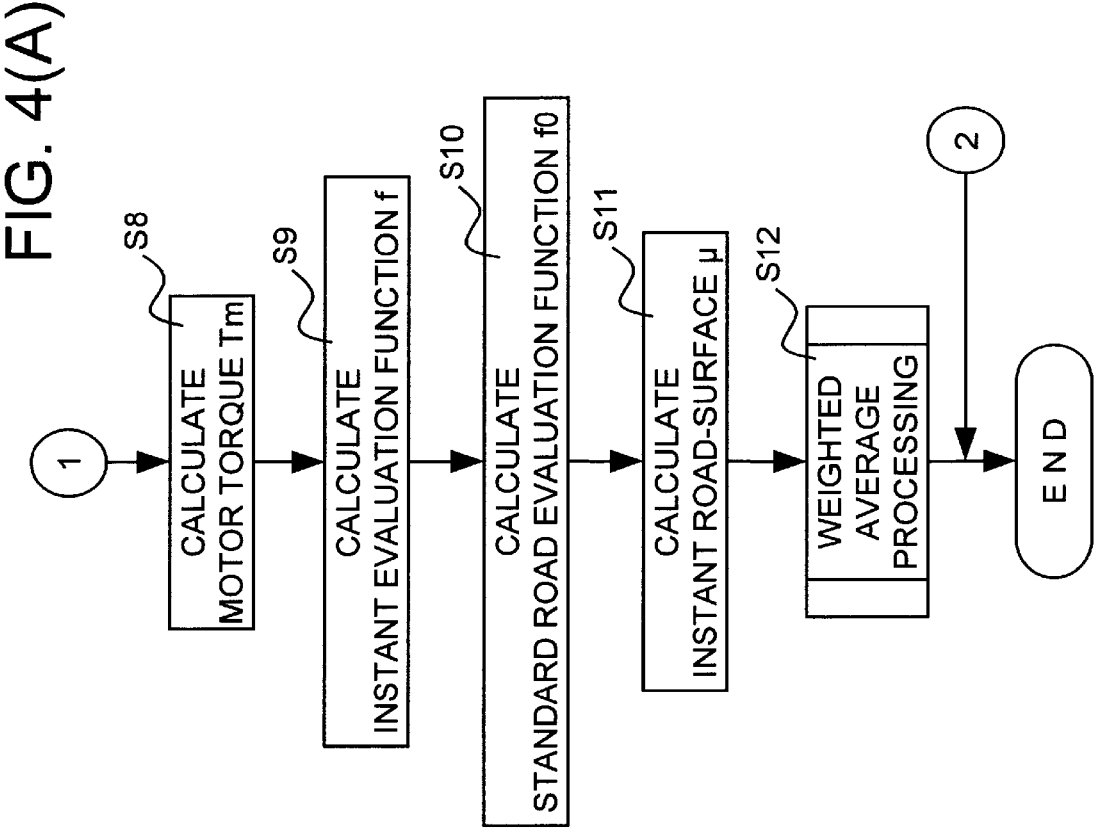
FIG. 4(B) is a flowchart for a weighted average processing.

FIG. 4(B) is a flowchart showing the detail of the leveling process.

In a first step S20, the number N2 of a weighted average is incremented. In a subsequent step S21, an integrated value $\Sigma \alpha$ is calculated. The calculation of the integrated value $\Sigma \alpha$ is led by adding the conditional evaluation function ratio $\alpha x$ calculated at this control cycle to the integrated value $\Sigma \alpha$ calculated at the previous control cycle.

Accordingly, the integrated value $\Sigma \alpha$ is of the integration in many evaluation function ratios calculated at the past and previous control cycles.

In a subsequent step S22, the number of integration is checked. Namely, it is judged whether the number N2 of the weighted average is smaller than or equal to a predetermined number N1 (N1 is 30 times in this embodiment).

In step S22, if the number N2 of the weighted average is smaller than or equal to the predetermined number N1, a weighted average processing is carried out in step S23 by the integrated value $\Sigma \alpha$ calculated in step S21 with the number N2 ($\leq$N1) of the weighted average. At last, the evaluation function ratio $\alpha$ is calculated relative to the road-surface $\mu$ and then, the processing routine goes through this control operation (flowchart in FIG. 4(B)).

In the aforementioned step S22, if the number N2 of the weighted average exceeds the predetermined number N1, the weighted average processing is carried out in step S23. Namely, value subtracting the evaluation function ratio $\alpha$ memorized at the previous control cycle from the integrated value $\Sigma \alpha$ calculated in step S21 is memorized into the RAM 23 as a present integrated value $\Sigma \alpha$ at this control cycle.

In further step 824, the weighted average processing is executed by dividing the pre sent integrated value $\Sigma \alpha$ calculated at this control cycle with the predetermined number N1. At last, the evaluation function ratio $\alpha$ is calculated relative to the road-surface $\mu$ and then, the calculated evaluation function ratio $\alpha$ is memorized into the RAM 23. Moreover, in step 824, the predetermined number N1 is memorized into the RAM as the number N2 of the weighted average in the same step. After the processing of step 822, the processing routine goes through this control operation.

The weighted average processing in steps S23 and S24 corresponds to the leveling process.

As described above, the evaluation function ratio $\alpha$ relative to the road-surface $\mu$ is calculated in step S22 finally. The calculation of the evaluation function ratio $\alpha$ is executed in a road-surface estimation section (road-surface $\mu$ estimation means) 37.

The processing of steps S3–S7 corresponds to a road-surface condition judgment means for judging whether being applicable or not to estimate the road-surface $\mu$. The processing of step S3 corresponds to a vehicle speed condition judgment means, that of step S4 does to a steering angle judgment means, that of step S5 does to a steering angular velocity judgment means, that of step S6 does to a steering direction judgment means, and that of step S7 does to a steering torque judgment means for judging a magnitude of the steering torque.

(Applicable Example)

Next, it will be described with reference to FIG. 2 and FIGS. 6–12, such road-surface $\mu$ responsive assist control, road-surface $\mu$ responsive torque-inertia-compensation control, road-surface $\mu$ responsive handle-return control and road-surface $\mu$ responsive damper control using the evaluation function ratio $\alpha$ proportional to the road-surface $\mu$.

Besides, in explanation of functions in the CPU 21, various parameters such "vehicle speed V", "steering torque Th", "steering angle $\theta$ and so on are used, for convenience of explanation, as signals corresponding thereto.

Figure 2:
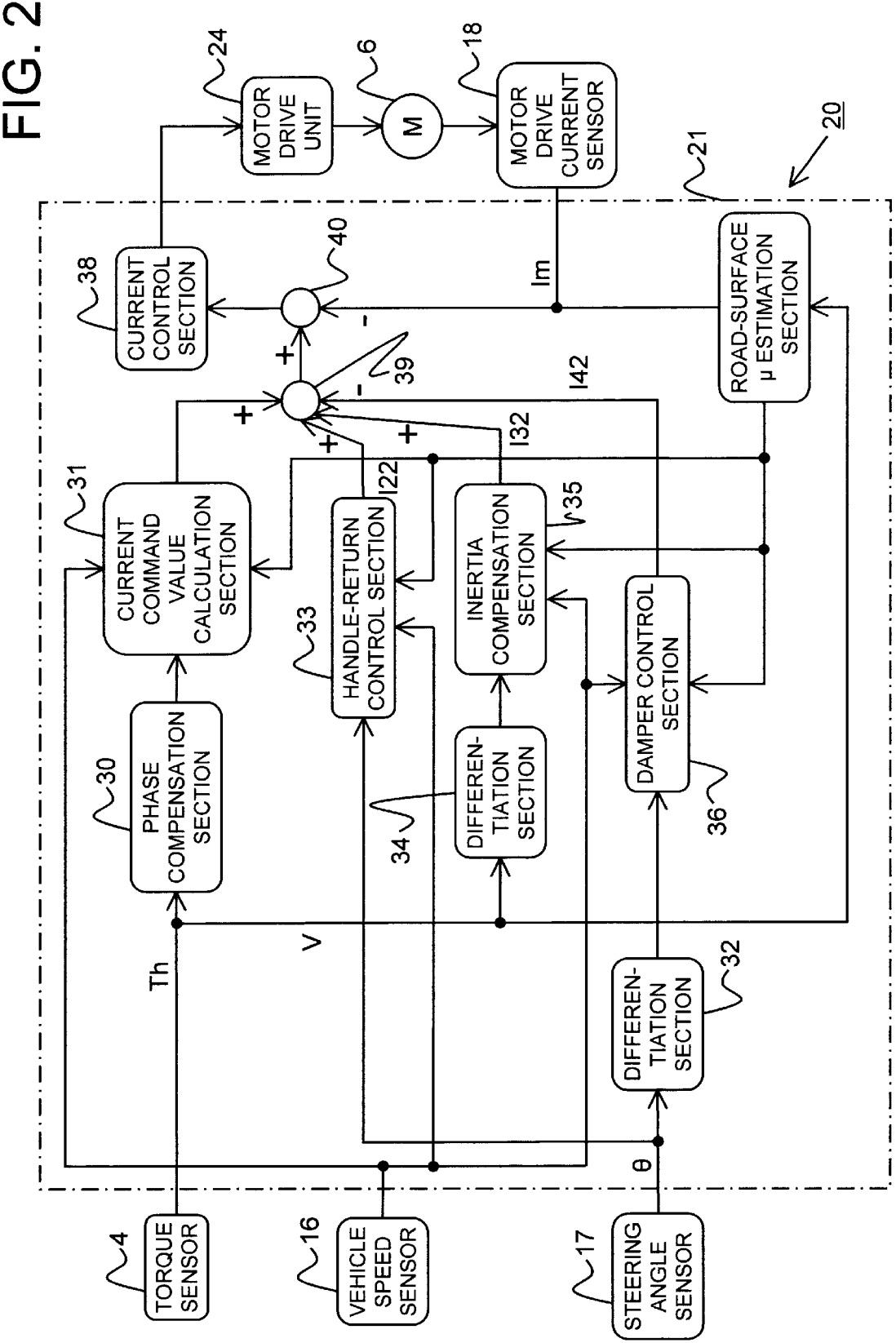
FIG. 2 is a block diagram showing the control unit in FIG. 1.

FIG. 2 shows a control block diagram of the CPU 21, more particularly that indicates functions executed in the CPU 21 in this embodiment. For example, a phase compensation section 30 is not an independent hardware, and presents a phase compensation function executed in the CPU 21. Similarly, the structures inside of the CPU 21 shown in FIGS. 5–12 present processing functions executed in the CPU 21 by control programs, and does not mean actual hardware structures.

Functions and operations of the CPU 21 will be described hereinafter.

(Road-Surface $\mu$ Responsive Assist Control)

The steering torque Th input from the torque sensor 4 is phase-compensated in the phase compensation section 30 to improve a stability of the steering system, and is then inputted to a current command value calculation section 31. Similarly, the vehicle speed V detected by the vehicle speed sensor 16 is also inputted to the current command value calculation section 31. The current command value calculation section 31 determines, based upon the inputted steering torque Th and vehicle speed V and the evaluation function ratio α, a road-surface μ responsive assist command value (corresponding to the assist current command value) I that is a control target value of current supplied to the motor 6.

The current command value calculation 31 is composed of a vehicle speed responsive assist-torque calculation section 100, a road-surface μ responsive assist-torque calculation section 110, and a road-surface μ responsive assist-gain calculation section 120.

As shown in FIG. 6, the vehicle speed responsive assist-torque calculation section 100 calculates a standard assist current Id based upon various parameter that are the inputted steering torque Th and vehicle speed V.

In the concrete, the steering torque Th is inputted into a high-speed assist map 101 and then a high-speed assist current (a high-speed assist amount) is read out. Further, the steering torque Th is inputted into a low-speed assist map 102 and then a low-speed assist current (a low-speed assist amount) is read out. The read-out high-speed assist current and low-speed assist current are inputted into multiplication sections 104 and 105, respectively.

On the other hand, the vehicle speed V is inputted into an assist-vehicle-speed gain map 103 and then an assist-vehicle-speed gain k1 is read out therefrom based upon the vehicle speed V. The assist-vehicle-speed gain k1 is inputted into a multiplication section 105 and an addition section 107. "1" is added to the assist-vehicle-speed gain k1 inputted into the addition section 107 after its sign thereof is reversed, the added result (1−k1) is inputted into the multiplication section 104. The multiplication section 104, after multiplying the inputted result (1−k1) by the high-speed assist current, inputs its output value into the addition section 106. Further, the multiplication section 105, after multiplying the inputted assist vehicle-speed gain k1 by the low-speed assist current, inputs its output value into the addition section 106. The addition section 106 inputs into the road-surface μ vehicle-speed responsive assist-torque calculation section 110, the standard assist current Id that is obtained by adding each value multiplied in the multiplication sections 104 and 105.

While, the evaluation function ratio α is inputted into the road-surface μ responsive assist-gain calculation section 120. In the road-surface μ responsive assist-gain calculation section 120, there is provided a road-surface μ responsive assist-gain map. As shown in FIG. 7(B), the road-surface μ responsive assist-gain map is composed of two-dimensional map corresponding the evaluation function ratio α to the road-surface μ responsive assist-gain. The road-surface μ responsive assist-gain calculation section 120 determines a road-surface μ responsive assist-gain G1 from the road-surface μ responsive assist-gain map after the evaluation function ratio α is inputted thereto, and the road-surface responsive assist-gain G1 is then inputted into the road-surface μ vehicle-speed responsive assist-torque calculation section 110. The road-surface μ vehicle-speed responsive assist-torque calculation section 110 calculates a road-surface μ vehicle-speed responsive assist-command value I by multiplying the standard assist current Id by the road-surface μ responsive assist-gain G1, and the calculated road-surface μ vehicle-speed responsive assist-command value (assist current) I is outputted into an addition section 39 shown in FIG. 2.

The addition section 39 outputs into a subtraction section 40 a result value obtained by adding the road-surface μ vehicle-speed responsive assist-command value I and output values from the other section (described hereafter). The subtraction section 40 outputs into the current control section 38 a signal (corresponding to the assist-current control value) corresponding to the difference between the output signal from the addition section 39 and the actual motor current Im.

The current control section 38 outputs into the motor drive unit 40 a signal based upon the difference between the actual motor current Im and the output of the subtraction section 40.

As a result, an applicable assist force corresponding to the condition of the road-surface is obtained with the motor 6 by drive-controlling the motor 6 through the motor drive unit 24.

Namely, in a case the vehicle travels on the snowed road or the crust (eisbahn) that is small in the road-surface reaction force, the assist force corresponding to the road-surface μ is generated by the motor 6, so that the assist force by the motor 6 does not become large in no connection with the road-surface μ, whereby the stability of the steering operation can be improved.

(Road-Surface μ Responsive Handle-Return Control)

Next, the road-surface μ responsive handle-return control will be described. Besides, only a handle-return torque calculation in a handle-return control section 33 will be described and however, another function in the handle-return control section 33, i.e., time interval determination of the handle-return operation and etc. is omitted about its explanation because of being executed with a public measures.

The handle-return control is carried out by returning a handle-return current to the motor 6, to set the handle-return current to zero when the steering wheel 1 is returned to the vicinity position where the vehicle travels at straight.

As shown in FIG. 2, the handle-return control section 33 calculates the road-surface μ vehicle-speed responsive handle-return torque based upon the steering angle θ, vehicle speed V and evaluation function ratio α when the handle is returned.

Figure 8:
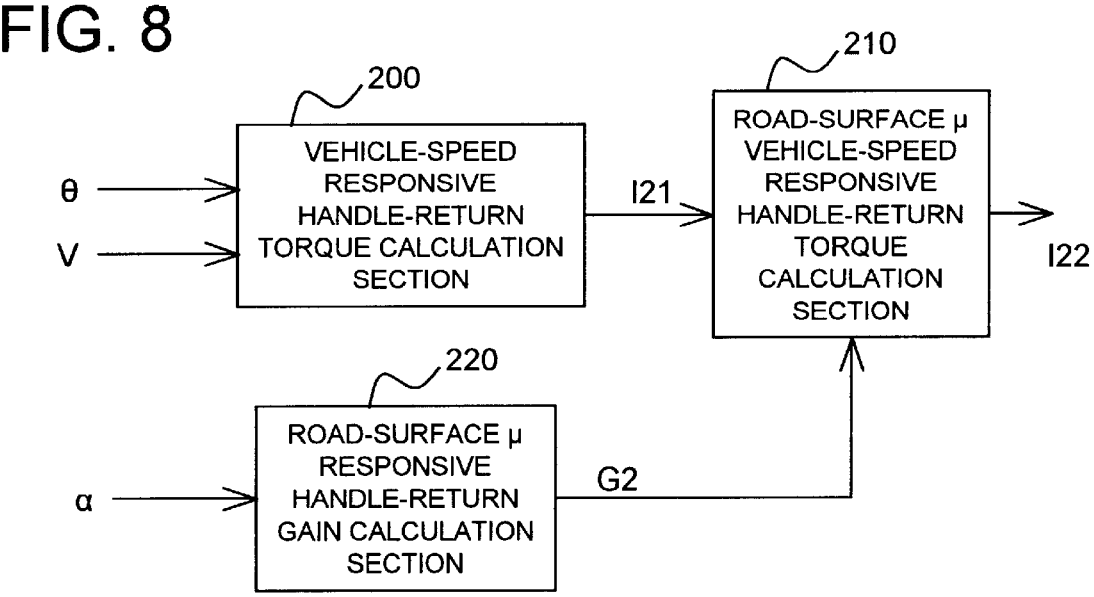
FIG. 8 is a control block diagram for a vehicle speed responsive handle-return control section.

FIGS. 8 and 9 are functional block diagrams showing the handle-return calculation in the handle-return control section 33.

As shown in FIG. 8, the handle-return control section 33 is provided with a vehicle-speed responsive handle-return torque calculation section 200, a road-surface μ vehicle-speed responsive handle-return torque calculation section 210 and a road-surface μ responsive handle-return gain calculation section 220.

Figure 9A:
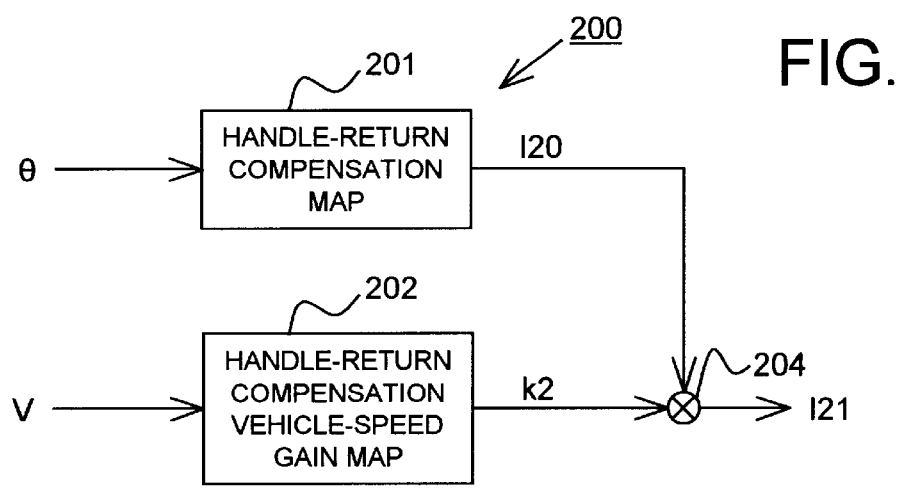
FIG. 9(A) is a control block diagram for a vehicle speed responsive handle-return torque calculation section.

Further, the handle-return control section 33, as shown in FIG. 9(A), is provided with a handle-return compensation map 201, a handle-return compensation vehicle-speed gain map 202 and a multiplication section 203. A handle-return torque I20 is read out by inputting the steering torque θ into the handle-return compensation map 201 in the vehicle-speed responsive handle-return torque calculation section 200, and then it is inputted into the multiplication section 203. Furthermore, a handle-return gain k2 is read out by inputting the vehicle speed V into the handle-return compensation vehicle-speed gain map 202, and then it is inputted into the multiplication section 203. In the multiplication section 203, after the inputted handle-return vehicle-speed gain k2 is multiplied by the handle-return torque I20, the multiplied value I21 is inputted into the road-surface μ responsive handle-return torque calculation section 210.

On the other hand, the evaluation function ratio α is inputted into the road-surface μ responsive handle-return gain calculation section 220.

Figure 9B:
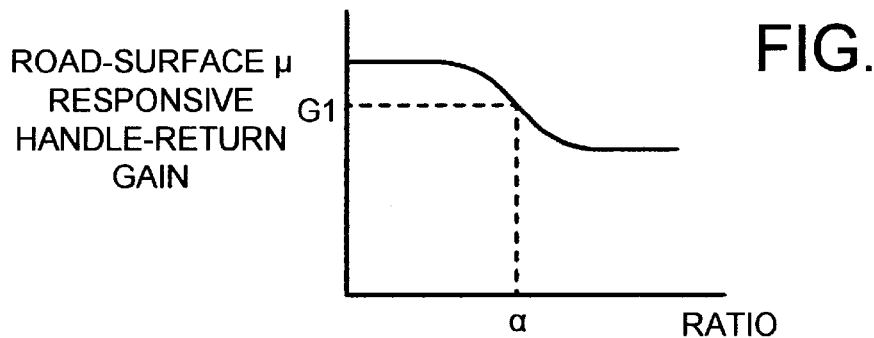
FIG. 9(B) shows a road-surface $\mu$ responsive handle-return gain map.

In the gain calculation section 220, there is provided a road-surface μ responsive handle-return gain map. This gain map, as shown in FIG. 9(B), is composed with a two-dimensional map corresponding the evaluation function ratio α to road-surface μ responsive handle-return gain. When the evaluation function ratio α is inputted into the road-surface μ responsive handle-return gain calculation section 220, a responsive handle-return gain G2 is read out from the road-surface μ responsive handle-return gain map and is inputted into the road-surface μ responsive handle-return torque calculation section 210. The torque calculation section 210 calculates a road-surface μ vehicle-speed responsive handle-return torque I22 by multiplying the multiplied value I21 from the multiplication section 203 by the road-surface μ, responsive handle-return gain G2, and the calculated handle-return torque I22 is then inputted into the addition section 39.

Thereafter, the motor 6 is driven by the current control section 38 and so on based upon the handle-return torque I22.

Consequently, a return handle torque corresponding to the road-surface μ can be obtained by the motor 6 when the return handle control is executed.

(Road-Surface Responsive Torque-Inertia-Compensation Control)

Next, a road-surface responsive torque-inertia-compensation control will be described hereinafter.

The inertia compensation control is to compensate influence of inertial moment for mechanisms included in the electrical-motor-driven power steering apparatus. In a case that the steering operation is carried out by an extremely amount when the vehicle travels at straight, a force in an opposite direction relative to the steering operation direction is caused by the influence of the inertial moment in the aforementioned mechanisms, so that the steering feeling is deteriorated. Therefore, this inertia compensation control is executed to prevent the steering feeling from deteriorating. This is to control so that rotor inertia of the motor 6 becomes like small, for example, to dissolve the weight generated by that the motor 6 does not follow rotation of the handle when the handle is turned quickly, or to quickly return the handle when the handle is released.

As shown in FIG. 2, after the steering torque Th is differentiated by a differentiation section 34, its differentiated value dTh/dt is inputted into a inertia compensation section 35. The inertia compensation section 35 calculates a road-surface μ vehicle-speed responsive torque-inertia compensation torque I32 from the inputted differentiated value dTh/dt, vehicle speed V and evaluation function ratio α, and then outputs the same to the addition section 39.

Figure 10:
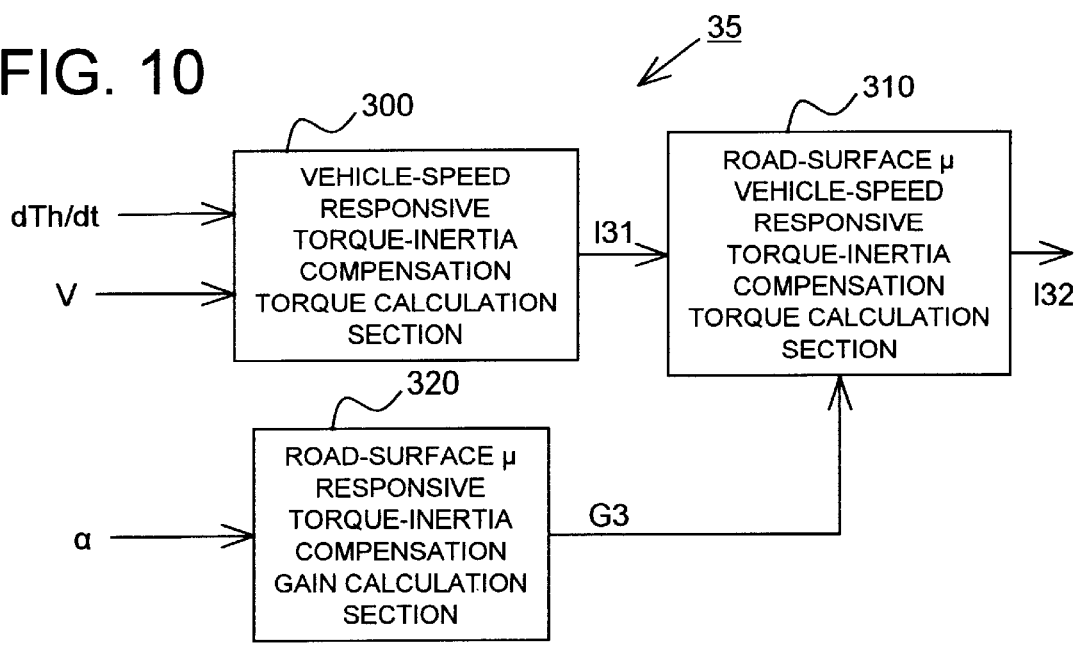
FIG. 10 is a control block diagram for an inertia compensation section.

More particularly, the inertia compensation section 35 as shown in FIG. 10 is composed of a vehicle-speed responsive torque-inertia compensation torque calculation section 300, a road-surface μ vehicle-speed responsive torque-inertia compensation torque calculation section 310 and a road-surface μ responsive torque-inertia compensation gain calculation section 320. Further, the vehicle-speed responsive torque-inertia compensation torque calculation section 300 is provided with an inertia compensation map 301, an inertia compensation vehicle-speed gain map 302 and a multiplication section 303.

Figure 11A:
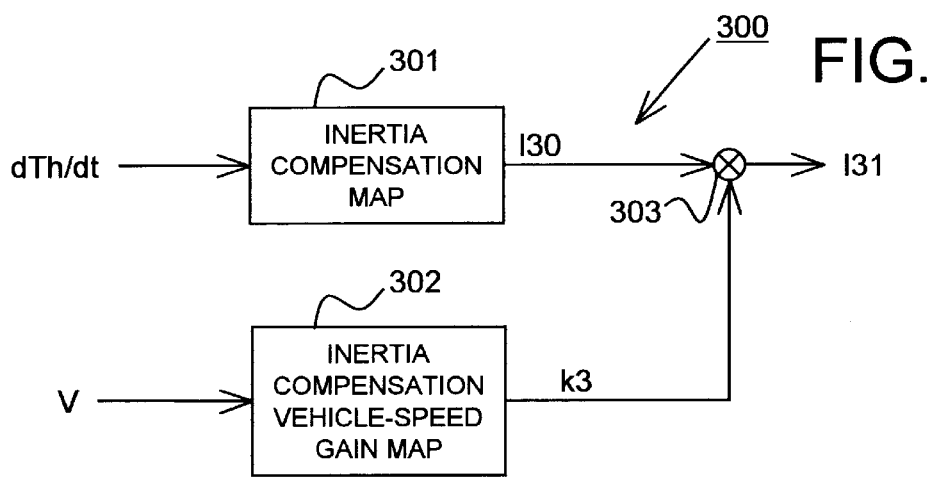
FIG. 11(A) is a control block diagram for a vehicle-speed responsive torque-inertia compensation torque calculation section.

As shown in FIG. 11(A), an inertia compensation torque I30 is read out by inputting the differentiated value dTh/dt of the steering torque into the inertia compensation map 301, and it is then inputted into the multiplication section 303.

Furthermore, an inertia compensation vehicle-speed gain k3 is read out by inputting the vehicle speed V into the inertia compensation vehicle-speed gain map 302, and it is then inputted into the multiplication section 303. After the inertia compensation torque I30 is multiplied by the inputted inertia compensation vehicle-speed gain k3, the multiplication section 303 outputs the multiplied value I31 into the road-surface μ vehicle-speed responsive torque-inertia compensation torque calculation section 310.

Figure 11B:
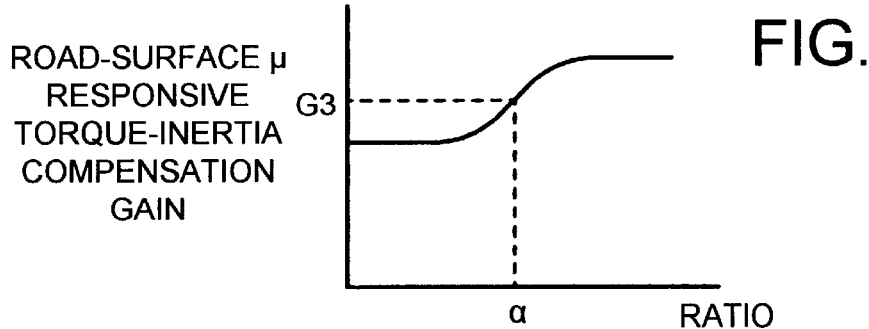
FIG. 11(B) shows a road-surface $\mu$ responsive torque-inertia compensation gain map.

On the other hand, the evaluation function ratio α is inputted into the road-surface μ responsive torque-inertia compensation gain calculation section 320 in which road-surface μ responsive torque-inertia compensation gain map is provided. The road-surface μ responsive torque-inertia compensation gain map, as shown in FIG. 11(B), is composed of a two-dimensional map corresponding the evaluation function ratio α to road-surface μ responsive torque-inertia compensation gain.

In the road-surface μ responsive torque-inertia compensation gain calculation section 320, a road-surface μ responsive torque-inertia compensation gain G3 is obtained from the road-surface μ responsive torque-inertia compensation gain map by inputting the evaluation function ratio α, and it is then inputted into the road-surface μ vehicle-speed responsive torque-inertia compensation torque calculation section 310. The road-surface μ vehicle-speed responsive torque-inertia compensation torque calculation section 310 calculates a road-surface μ vehicle-speed responsive torque-inertia compensation torque I32 by multiplying the road-surface μ responsive torque-inertia compensation gain G3 by the multiplied value I31 from the multiplication section 303, and then the addition section 39 adds the road-surface μ vehicle-speed responsive torque-inertia compensation torque I32 onto the road-surface μ vehicle-speed responsive assist command value (assist current) I.

As a result, the inertia compensation control corresponding to the road-surface μ can be executed.

(Road Responsive Damper Control)

Next, a damper control will be described hereinafter.

The damper control means to control that the steering wheel 1 exceeds over the neutral position by the inertia of the motor 6 when the handle is returned, i.e., is of controlling to improve a convergence to the neutral position of the steering wheel 1 when the handle is returned at the high-speed traveling of the vehicle.

As shown in FIG. 2, after a differentiation section 32 differentiates the steering angle θ from the steering angle sensor 17, a steering angular velocity θV (the differentiated steering angle θ) is inputted into a damper control section 36. The damper control section 36 calculates a road-surface μ vehicle-speed damper torque I42 from the inputted steering angular velocity θV, vehicle speed V and the evaluation function ratio α, and the calculated damper torque I42 is then inputted into the addition section 39.

Figure 12:
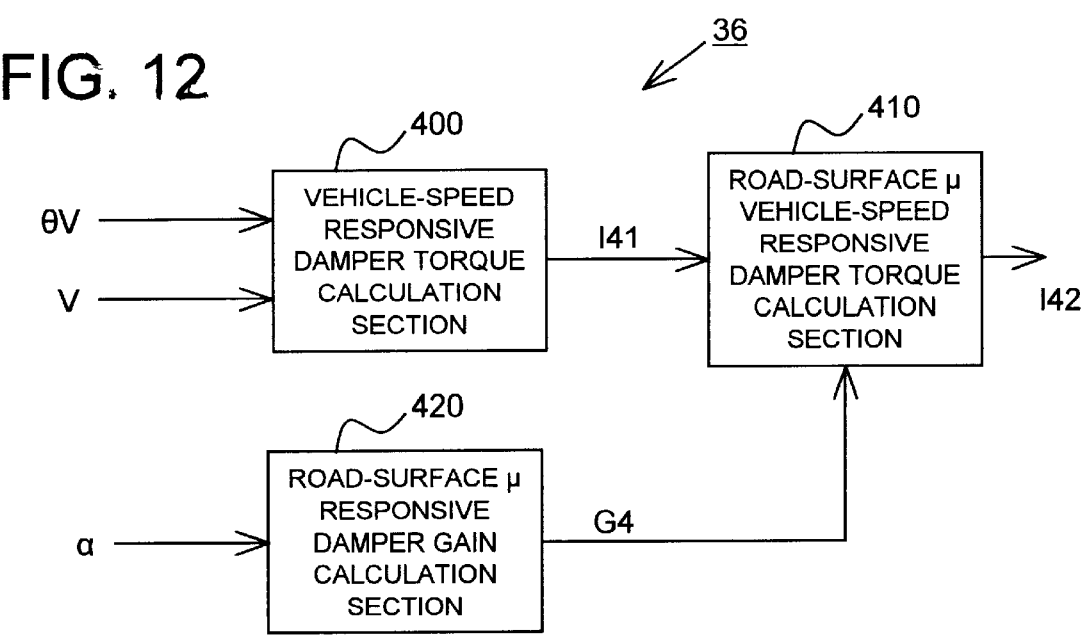
FIG. 12 is a control block diagram for a damper control section.
Figure 13A:
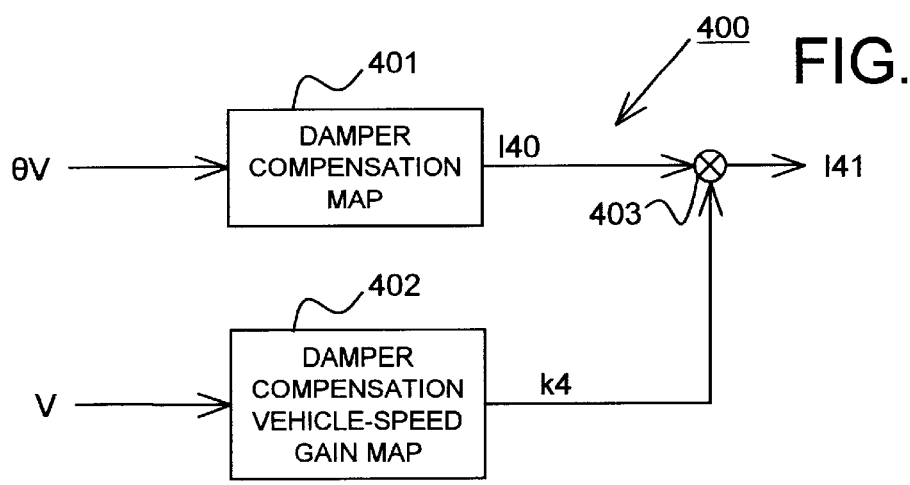
FIG. 13(A) is a control block diagram for a vehicle-speed responsive damper torque calculation section.

Bodily, the damper control section 36 shown in FIG. 12 is composed of a vehicle-speed responsive damper torque calculation section 400, a road-surface μ vehicle-speed responsive damper torque calculation section 410 and a road-surface μ responsive damper gain calculation section 420. In the vehicle-speed responsive damper torque calculation section 400, there are provided a damper compensation map 401, a damper compensation vehicle-speed gain map 402 and a multiplication section 403, as shown in FIG. 13(A).

In the same figure, a damper compensation torque I40 is read out by inputting the steering angular velocity θV into the damper compensation map 401, and it is then inputted into the multiplication section 403.

Further, the vehicle speed V is supplied into the damper compensation vehicle-speed gain map 402 to read out a damper compensation vehicle-speed gain k4, and then the gain k4 is inputted into the multiplication section 403. In the multiplication section 403, a after the inputted damper compensation vehicle-speed gain k4 is multiplied by the damper compensation torque I40, a multiplied value I41 is supplied into the road-surface $\mu$ vehicle-speed responsive damper torque calculation section 410.

Figure 13B:
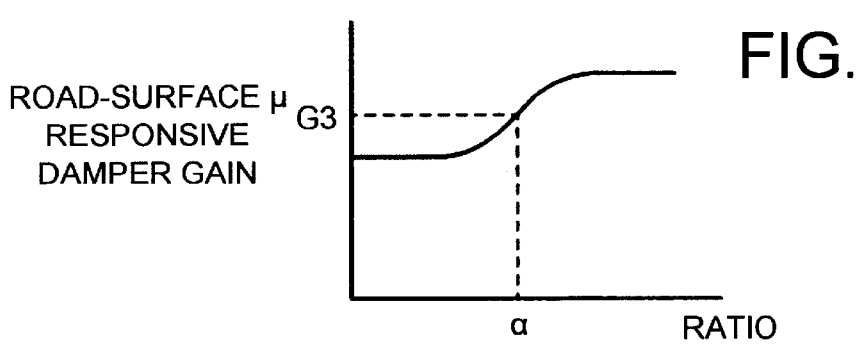
FIG. 13(B) shows a road-surface $\mu$ responsive damper gain map.

On the other hand, the evaluation function ratio $\alpha$ is supplied into the road-surface $\mu$ responsive damper gain calculation section 420 in which a road-surface $\mu$ responsive damper gain map is provided. The road-surface $\mu$ responsive damper gain map, as shown in FIG. 13(B), is composed of a two-dimensional map corresponding the evaluation function ratio $\alpha$ to the road-surface $\mu$ responsive damper gain.

The evaluation function ratio $\alpha$ is inputted into the road-surface $\mu$ responsive damper gain calculation section 420 to obtain a road-surface $\mu$ responsive damper gain G4 from the road-surface $\mu$ responsive damper gain map, and the obtained damper gain 64 is inputted into the road-surface $\mu$ vehicle-speed responsive damper torque calculation section 410. The torque calculation section 410 calculates a road-surface $\mu$ vehicle-speed responsive damper torque I42 by multiplying the multiplied value I42 from the multiplication section 403 by the road-surface $\mu$ responsive damper gain G4, and the calculated damper torque I42 is outputted into the addition section 39 in which it is added onto the road-surface $\mu$ vehicle-speed responsive assist command value (assist current) I.

With this control operation, the damper control corresponding to the road-surface $\mu$ can be executed in the damper control operation.

According to the electrical-motor-driven power steering apparatus as described in the aforementioned embodiment, the following effects can be obtained.

In this embodiment, there is provided the CPU 21 (estimation means) for estimating the road-surface reaction force based upon the motor current Im (motor command value) and the steering torque Th. Namely, in the CPU 21, there is provided the road-surface $\mu$ estimation section 37 for estimating the coefficient of friction $\mu$ on the road-surface.

Therefore, even if the vehicle travels on the snowed road or on the crust (eisbahn), the stability of the steering operation can-be improved. Further, the road-surface $\mu$ is estimated based upon the motor current Im (motor command value) and the steering torque Th, so that the number of parameters for estimating the road-surface $\mu$ can be reduced. Therefore, the calculation time can be also diminished by reduction of the parameter, whereby the CPU 21 can be constructed in low-cost without requiring high-ability therefor.

Furthermore, with reduction of the parameter, noise in the detection operation can be reduced in its probability, so that the influence by noise can be reduced, whereby the estimation of the road-surface $\mu$ can be executed further precisely.

In this embodiment, when the CPU 21 estimates the evaluation function ratio $\alpha$ relative to the road-surface $\mu$, the road-surface $\mu$ is estimated by comparing the standard road evaluation function f0 (standard value) previously memorized corresponding to the vehicle speed V and steering angle $\theta$ with the inputted vehicle speed V and steering angle $\theta$. Namely, since the estimation for the road-surface $\mu$ corresponding to the vehicle speed V and steering angle $\theta$ is carried out, the estimation of the road-surface $\mu$ can be executed better than that using the standard road evaluation function f0 in which the vehicle speed V and steering angle $\theta$ are regarded to constant.

Further, in this embodiment, when the road-surface $\mu$ estimation control program is executed, the road-surface $\mu$ can be estimated in a case that the vehicle speed V and steering angle $\theta$ exist within the predetermined ranges respectively. Therefore, the road-surface $\mu$ can be estimated where the vehicle speed V and steering angle $\theta$ exist in most applicable condition, so that the estimation of the road-surface $\mu$ can be executed precisely.

Furthermore, in this embodiment, there are executed the road-surface $\mu$ responsive assist control, the road-surface $\mu$ responsive handle-return control, the road-surface responsive damper control, and the road-surface responsive torque-inertia compensation control based upon the estimated road-surface $\mu$. Accordingly, the control operation corresponding to the road-surface $\mu$ in traveling of the vehicle can carried out accurately.

Moreover, in this embodiment, the CPU 21 (estimation means) executes, in step S12, the weighted average processing (leveling processing) taking account into the road-surface $\mu$ estimated previously to estimate the road-surface $\mu$. Therefore, the dispersion in estimation can be reduced by the weighted average processing, whereby the estimation can be executed more precisely.

Due to the road-surface condition (bad road or dirt road, etc.), influence in pitching of the tire (vertical vibration) and a tire condition, the dispersion in value of the road-surface $\mu$ calculated instant occurs, whereby it is difficult to calculate a precise value thereof, for example. In this embodiment, the leveling processing by the weighted average is executed by the predetermined numbers (30 times in step S24)(in a case that the sampling time is set to 10 ms, the average for 300 ms is obtained), so that the dispersion in the road-surface $\mu$ can be restrained, whereby the road-surface $\mu$ can be calculated further precisely.

Second Embodiment

Figure 15:
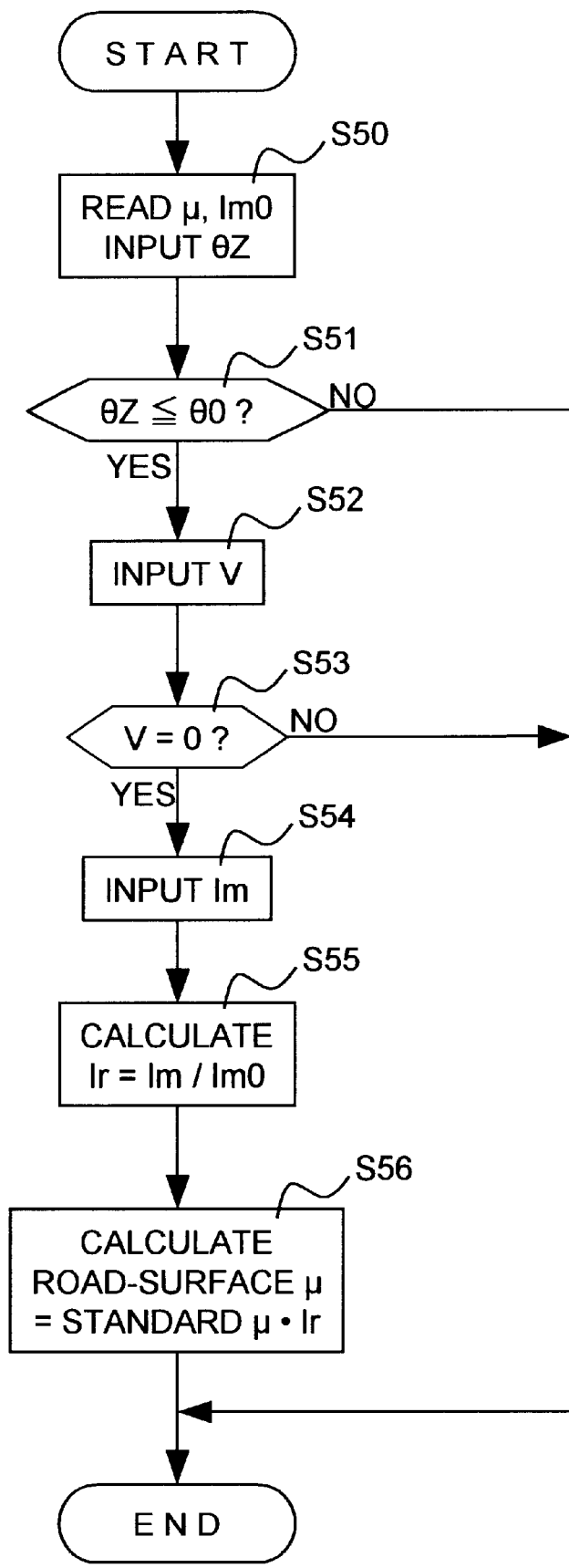
FIG. 15 is a flowchart for a road-surface $\mu$ estimation control program.
Figure 16:
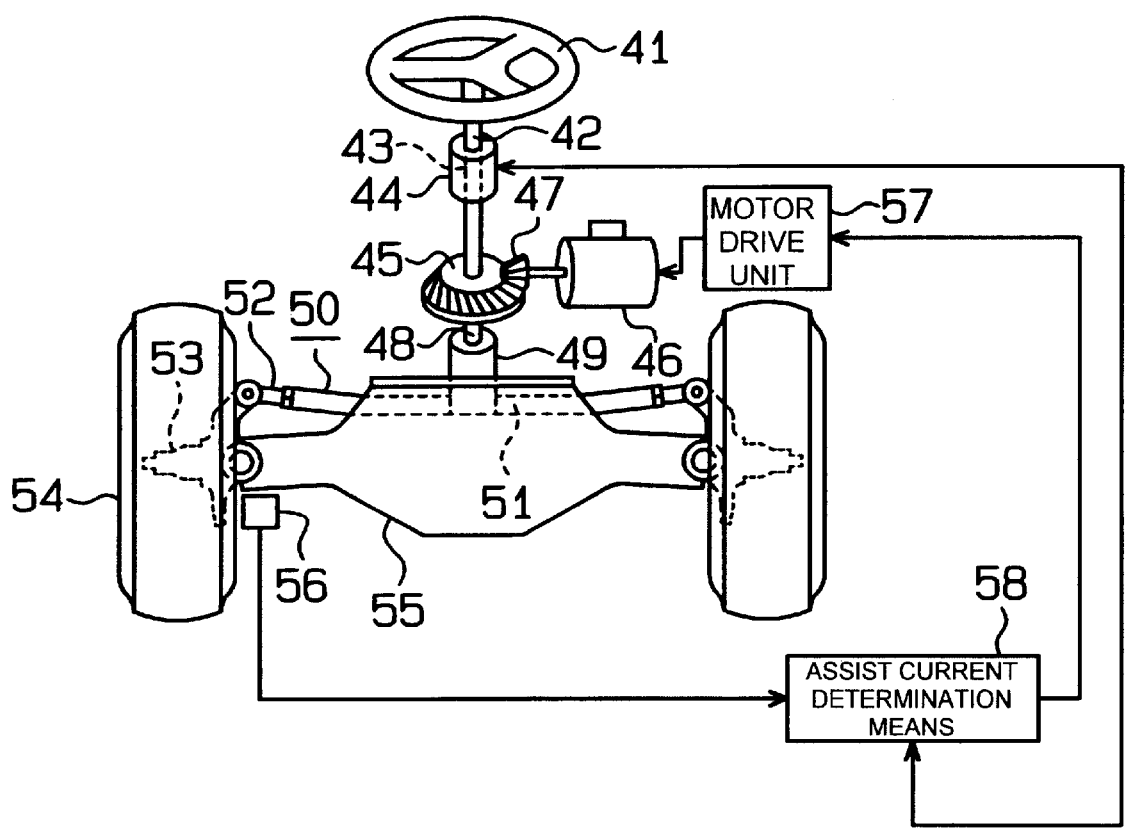
FIG. 16 is a block diagram schematically showing a conventional control unit of an electrical-motor-driven power steering apparatus.

Next, a second embodiment of the present invention will be described hereinafter with reference to FIGS. 14 and 15.

Besides, the same construction as the first embodiment or the corresponding construction thereto is affixed with the same reference number, and therefore its explanation is omitted. Further, in this embodiment, there is provided the same hardware construction as the first embodiment in an electrical-motor-driven power steering apparatus.

FIG. 14 shows an electrical diagram of a control unit according to this embodiment. In the same figure, the inside structure of a CPU 21 indicates function executed by programs. A road-surface $\mu$ estimation means does not an independent hardware; and presents a road-surface $\mu$ estimation processing executed inside of the CPU 21.

The CPU 21 provides a road-surface $\mu$ estimation means 60, a handle-return amount compensation means 70 and a current command determination means 80. To the road-surface $\mu$ estimation means 60, there are electrically connected a vehicle speed sensor 16, a motor drive current sensor 18 and an absolute steering angle detection means 7, and there are inputted a vehicle speed V, a motor current Im and an absolute steering angle $\theta Z$ therefrom. When predetermined conditions of the absolute steering angle $\theta$ and vehicle speed are satisfied, a road-surface reaction force is estimated based upon the motor current Im, i.e., the estimation for the road-surface $\mu$ is executed. The absolute steering angle detection means 7 is to detect the absolute steering angle $\theta Z$ of a steering wheel 1 in operation, and is composed of an absolute angular sensor and so on. The absolute steering angle means an angle from a predetermined standard position.

The handle-return amount compensation means 70 determines a handle-return amount based upon the absolute steering angle θZ from the absolute steering angle detection means 7, the road-surface μ from the road-surface μ estimation means 60 and the vehicle speed V from the vehicle speed sensor 16, and then its determined handle-return amount is outputted into the current command determination means 80.

The current command determination means 80 executes an assist control operation of a motor 6 based upon a steering torque Th from a torque sensor 4, the vehicle speed V from the vehicle speed sensor 16 and the road-surface μ from the road-surface μ estimation means 60. Further, the handle-return amount from the handle-return amount compensation means 70 is inputted into the current command determination means 80, a current command value taking account into the handle-return amount is outputted into a motor drive unit 24.

Operation of the Second Embodiment

In the electrical-motor-driven power steering apparatus as constructed above, the operation when the road-surface μ estimation control program is executed will be explained hereinafter. This control program is to estimate the road-surface μ in order to estimate the road-surface reaction force when the steering wheel 1 is turned in a case that the vehicle speed V is zero, i.e., that the vehicle stops.

Besides, the road-surface μ estimation control program is stored in a ROM 22 and is executed at a constant interval time (periodically), similarly to the first embodiment.

In step S50, a standard road-surface μ and a standard motor current Im0 are read out from the ROM 22, and the absolute steering angle θZ is inputted. In this embodiment, the standard road-surface μ presents a coefficient of friction on a road-surface of an asphalted road that is a dry road, and is adopted by a value when the steering wheel 1 is operated by a predetermined steering angle (standard steering angle) in a case that the vehicle speed V is zero. Besides, the standard steering angle θ0 has a certain angle range. The standard motor current Im0 presents a motor current at that time when the standard road-surface μ is determined, and is previously detected and memorized in the ROM 22.

In step S51, it is judged whether the inputted absolute steering angle (inputted steering angle) θZ exists or not within the standard steering angle θ0. When the inputted absolute steering angle θZ does not exist within the standard steering angle θ0, the control operation of a flowchart in FIG. 15 is finished once. When the inputted absolute steering angle θZ exists within the standard steering angle θ0, the vehicle speed V is inputted in step in step S52, and then the control operation is advanced to step S53.

In step S53, it is judged that vehicle speed V is zero or not. If the vehicle speed V is not zero, i.e., if the vehicle does not stop, the control operation is finished once. If not so, the motor current Im is inputted in step S54, and then the control operation is advanced to step S55.

In step S55, a motor current comparison calculation is executed by the following equation to calculate a motor current ratio Ir.

$$Ir = Im/Im0 \quad (1)$$

Thereafter, in a subsequent step S56, the control operation is finished once after the road-surface μ calculation is executed base upon the following equation.

$$\text{Road-surface } \mu = \text{Standard road-surface } \mu \cdot Ir \quad (2)$$

In this embodiment, the control operation in steps S50–S56 corresponds to the road-surface μ estimation means 60. Thus-calculated road-surface μ is supplied to the current command determination means 80 and the handle-return amount compensation means 70.

According to the electrical-motor-driven power steering apparatus constructed above, the following effect is obtained.

In this embodiment, there is provided the CPU 21 (estimation means) for estimating the road-surface μ to estimate the road-surface reaction force based upon the motor current Im (motor current value). Namely, the CPU 21 includes the road-surface μ estimation means 60.

Therefore, the stability of the steering operation can be improved even if the vehicle travels on the snowed road or the crust (eisbahn).

In this embodiment, the number of parameter is further reduced as compared with the first embodiment, i.e., the road-surface μ is estimated based upon only the motor current Im, so that the calculation time can be further reduced as compared with the first embodiment. Therefore, it is required that the used CPU 21 does not have a high-ability, so that the production cost for the control unit can be reduced.

In addition, the number of parameter is diminished, so that noise in detection operation can be also diminished in probability. Therefore, influence in noise is so diminished, so that the estimation for the road-surface μ can be executed precisely.

Third Embodiment

Figure 17:
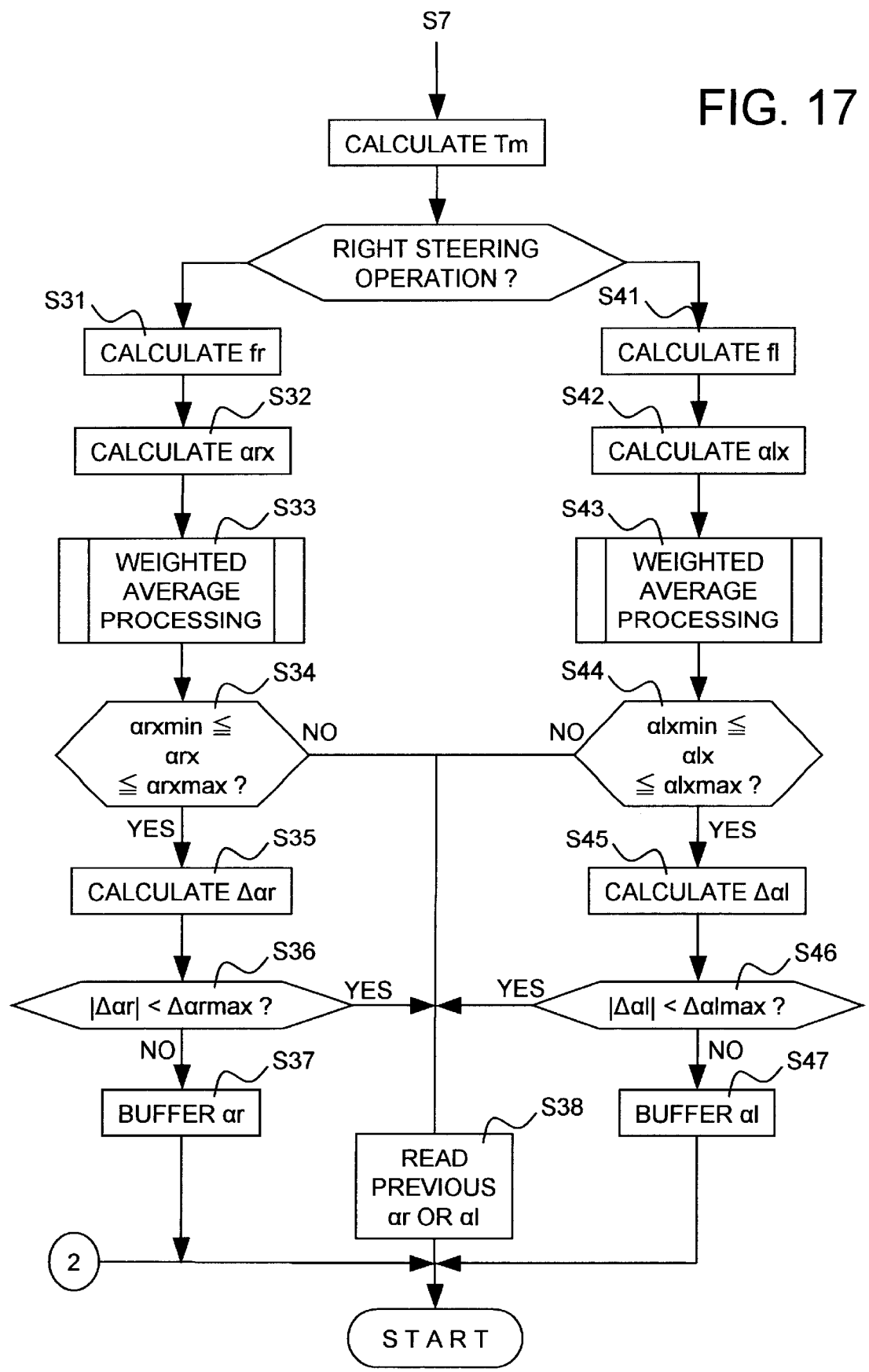
FIG. 17 is a flowchart for a road-surface $\mu$ estimation control program according to third embodiment of the present invention.

Next, a third embodiment of the present invention will be described with reference to FIG. 17. Besides, a hardware construction of this embodiment is constructed with that same as the first embodiment and however, a certain portion of software therein is different from that of the first embodiment. Accordingly, the same construction as the first embodiment or the corresponding construction thereto is affixed with the same reference number, and therefore its explanation is omitted. As a result, the portion different from the first embodiment will be described in detail hereinafter.

Besides, a RAM 23 in this embodiment corresponds to a memory means.

A road-surface μ estimation control program in this embodiment is same as that in steps S1–S8 of the first embodiment, and the control operation subsequent thereto is different from that thereof.

After a calculation processing in step S8 for a motor torque Tm, it is judged in step S30 whether a right-steering operation is executed or not. In a case that s steering angle is θ≧0, it is judged that the right-steering operation is executed, and then a control operation is advanced to step S31. Reversely, in a case that the steering angle is θ<0, it is judged that a left-steering operation is executed, and then the control operation is advanced to step S41.

Herein, the control operation in steps S31–S37 means a calculation processing routine for a right-steering operation evaluation function ratio αr, while that in steps S41–S47 means the calculation processing routine for a left-steering operation evaluation function ratio αl.

In the calculation processing routine for the right-steering operation evaluation function ratio αr, a calculation for a right-steering operation instant evaluation function fr is executed in step S31. This calculation processing is similar to that in step S9 of the first embodiment. Namely, the right-steering operation instant evaluation function fr means a right-steering operation instant function obtained at this control cycle, and is calculated form the following equation.

$$fr = Tm \cdot G + Th$$

G is a reduction ratio (coefficient).

In the next step S32, the processing corresponding to that in steps S10 and S11 of the first embodiment is carried out. In other words, a standard road evaluation function to is indexed, and then a right-steering operation conditional evaluation function ratio αrx (=fr/f0) is calculated based upon the right-steering operation instant evaluation function fr and the standard road evaluation function f0.

In a subsequent step S33, the right-steering operation evaluation function ratio αr is calculated by executing a weighted average processing as a leveling processing. Besides, the processing in step S33 is similar to that in step S12 of the first embodiment. In the next step S34, it is judged whether the right-steering operation evaluation function ratio αr exists within a range αrmin≦αr≦αrmax or not. Namely, this processing is to judge whether the right-steering operation evaluation function ratio αr calculated in step S33 is abnormal or not. Besides, the aforementioned αrmin and αrmax are experimental values, and are stored in the ROM 22 previously.

In a case that αr<αrmin or that αr>αrmax, the right-steering operation evaluation function ratio αr is judged to be abnormal, and the control operation is advanced to S38.

In a case that αr exists αrmin≦αr≦αrmax, a changing amount of αr is calculated in step S36. Namely, a difference Δαr between the present αr and αr calculated at the previous control cycle is calculated. In step S36, it is judged whether |Δαr|<Δαrmax or not. This processing is to judge whether the difference Δαr calculated in step S35 is abnormal or not. Besides, the aforementioned Δαrmax is an experimental value, and is stored in the ROM 22 previously.

In a case that |Δαr|≧Δαrmax, it is judged to be abnormal, and then the control operation moves to step S38. In contrast, in a case that |Δαr|<Δαrmax, it is judged to be formal, and then the control operation moves to step S37. In such a situation, Δαr is stored into a buffer area (a predetermined area of the RAM 23), and then this control operation is finished once.

Where the control operation moves from step S34 or S36 to step S38, it is read out such the right-steering operation evaluation function ratio αr that is a normal value stored in the buffer area of the RAM 23 at the previous control cycle. Further, the normal value is stored in a predetermined area of the RAM 23 to enjoy for calculations of various control compensation value executed thereafter, and the control operation, is finished once.

The processing executed in step S38 is to avoid that the abnormal value is applied to the latter calculations for various control compensation value. The abnormal value means a case that αr calculated at the present control cycle is smaller than αrmin or larger than αrmax, or that |Δαr| is equal to or larger than Δαrmax.

Next, in a case that steering angle θ is smaller than 0 in step S30, it is judged to a left-steering operation, and then the control operation moves to step S41.

In the calculation routine for the left-steering operation evaluation function αl, the same calculation routine as that of the right-steering operation evaluation function αr is executed. In a step corresponding to each step for the calculation routine of the right-steering operation evaluation function αr, the first order of magnitude is set to be common, and the second order of magnitude is exchanged to "4." The processing in step S31 corresponds to that in step S41.

Accordingly, in explanation for the calculation routine of the left-steering operation evaluation function αl, the right-steering operation evaluation function αr and fr are alternated to the left-steering operation evaluation function αl and fl, respectively. Further, the right-steering operation conditional evaluation function ratio αrx(=fl/f0) is alternated to the left-steering operation conditional evaluation function ratio αrx(=fl/f0), αrmini to αlmin, αrmax to αlmax, and Δαrmax to Δαlmax, respectively. Therefore, the explanation for the calculation routine of the left-steering operation evaluation function αl is omitted for convenience.

According to the control unit 20 of the electrical-motor-driven power steering apparatus as constructed in this embodiment, the following effect can be obtained.

In this embodiment, the CPU 21 serves to judge whether the road-surface μ estimated in the right-steering operation is the abnormal value or not as an abnormal detection means. In other words, it is judged in step S34 whether the right-steering operation evaluation function ratio αr exists within a range αrmin≦αr≦αrmax or not, i.e., whether the right-steering operation evaluation function ratio αr calculated in step S33 is the abnormal value or not.

Further, it is judged in step 44 whether the road-surface μ estimated in the left-steering operation is the abnormal value or not. Namely, it is judged in step S44 whether the left-steering operation evaluation function ratio αl exists within a range αlmin≦αl≦αlmax or not, i.e., whether the left-steering operation evaluation function ratio αl calculated in step S43 is the abnormal value or not.

Consequently, if the abnormal detection is not carried out, the bad feeling is generated in steering feeling when the abnormal occurs in the detected signals from torque sensor 4 and/or the motor drive current sensor 18 and/or the estimation calculation. In such a case, it is generated such that the handle is turned over (over-steer state) by that the steering operation is suddenly lightened or such that the handle is turned by an extremely small amount upon a heavy steering operation. According to this embodiment, thus-generated problems may be solved.

In this embodiment, the buffer area is provided in the RAM 23. In a case that the road-surface μ estimated by the CPU 21 is formal, it is constructed so that the estimated road-surface μ is stored in the buffer area. Therefore, if the coefficient of friction on the road-surface estimated by the CPU 21 is detected as the abnormal value, its abnormal value is alternated to the formal road-surface μ stored in the buffer area of the RAM 23 by the CPU 21.

As a result, if the abnormal detection is not carried out, the bad feeling is generated in steering feeling when the abnormal occurs in the detected signals from torque sensor 4 and/or the motor drive current sensor 18 and/or the estimation calculation. In such a case, it is generated such that the handle is turned over (over-steer state) by that the steering operation is suddenly lightened or such that the handle is turned by an extremely small amount upon a heavy steering operation. According to this embodiment, thus-generated problems may be avoided accurately.

In this embodiment, the coefficient of friction on the road-surface in the right- or left-steering operation is estimated independently. Even if the road-surface reaction force in the left-steering operation is different from that in the right-steering operation due to the coefficient of friction on the road-surface, its state can be recognized accurately.

Besides, the embodiments of the present invention may be changed as follows:

In the second embodiment, the road-surface μ is estimated when the vehicle speed V is zero and however, the vehicle speed V is not limited to zero. The road-surface μ may be estimated when the vehicle travels at a predetermined speed, for example.

In the first embodiment, the control unit 20 applies the road-surface μ to all of the road-surface μ responsive assist control, road-surface μ responsive handle-return control, road-surface responsive damper control, and road-surface responsive torque-inertia compensation control. However, the road-surface μ may be applied to one of the aforementioned controls or to any sets thereof.

In the first and second embodiments, the road-surface μ estimation section 37 and road-surface μ estimation means 60 are used as a estimation means by noticing the road-surface μ (condition on the road-surface) applied as a control parameter applying to the road-surface reaction force. However, the estimation for not condition on the road-surface but a condition of the tire (front wheel 14) is may be applied to various controls.

The condition of the tire (front wheel 14) means a tire type such a summer tire or winter tire, a tire air pressure, a tire wear and etc. The summer tire is smaller than the winter tire in its contact resistance on the road-surface, while the contact resistance becomes small as the tire wear becomes large.

In this case, by comparing a previously memorized road-surface reaction force corresponding to a certain vehicle speed V or steering angle θ in a standard tire type with a calculated road-surface reaction force, the tire type can be estimated. Similarly to each of the aforementioned embodiments, an evaluation function ratio α is calculated based upon a standard evaluation function, so that each of the various controls can be executed by using a two-dimensional map corresponding the evaluation function ratio α to a gain. Even if the tire air pressure or the tire wear is applied as a parameter, each of the various controls can be executed similarly.

Furthermore, a position of a center of gravity in the vehicle is influenced to the road-surface reaction force. Namely, in a case of the vehicle based a front-wheel-drive, the center of gravity in the vehicle moves backward in ascent, so that the contact resistance on the front wheel 14 becomes small. In contrast, in a case of a descent, the contact resistance on the front wheel 14 becomes large. In a case that a heavy load is installed in a back portion of the vehicle, the center of gravity in the vehicle moves backward, so that the contact resistance on the front wheel 14 becomes small. Reversely, in a case that a heavy load is installed in a front-side portion of the vehicle, the center of gravity in the vehicle moves forward, so that the contact resistance on the front wheel 14 becomes small. Further, a movement in the center of gravity is generated similarly in an acceleration operation and a deceleration operation.

The position at the center of gravity in the vehicle is estimated by a similar measures to each of the embodiment or to the aforementioned modification, so that an evaluation function ratio α is calculated based upon a standard evaluation function, whereby each of the various controls can be executed by using a two-dimensional map corresponding the evaluation function ratio α to a gain.

In the first and third embodiments, a weighted average processing is carried out as a leveling processing. However, a low-pass filter may be used as a leveling processing, or a moving average processing may be used therefor.

In the third embodiment, whether the road-surface μ is abnormal or not is executed in respective of a right- and left-steering operation. However, in the first or second embodiment, it is also applicable to judge whether an estimated road-surface μ is abnormal or not.

In the third embodiment, the abnormal of the road-surface μ is judged by whether a right-steering operation evaluation function ratio αr exists within a predetermined range (step S34) and by whether a left-steering operation evaluation function ratio αl exists within a predetermined range (step S44). Further, that abnormal is judged by whether |Δαr| presenting increase and decrease of the right-steering operation evaluation function ratio αr exists within a predetermined range. Furthermore, that abnormal is judged by whether |Δαl| presenting increase and decrease of the left-steering operation evaluation function ratio αl exists within a predetermined range.

Alternatively, in a case that the right-steering operation evaluation function ratio αr indicates an impossible value or that the left-steering operation evaluation function ratio αl indicates an impossible value, a road-surface μ may be judged to be abnormal.

Further, in a case that the right-steering operation instant evaluation function fr indicates an impossible value or that the left-steering operation instant evaluation function fl indicates an impossible value, a road-surface μ may be judged to be abnormal.

Moreover, in the first embodiment, the abnormal of a road-surface μ may be judged by whether an instant evaluation function f indicates an impossible value or not, or whether it exists within a predetermined range or not, or whether |Δα| presenting increase and decrease of the evaluation function ratio α exists within a predetermined range or not.

Obviously, numerous modifications and variations of the present invention are possible in light of the above teachings. It is therefore to be understood that within the scope of the appended claims, the present invention may be practiced otherwise than as specifically described herein.

What is claimed is:

1. A control unit for an electrical-motor-driven power steering apparatus, said control unit comprising:
    an assist current command value calculated based upon a steering torque of a steering wheel;
    an assist current control value calculated based upon a motor current value of a motor and said assist current command value;
    a motor for outputting an assist force based upon said assist current control value; and
    an estimation means for estimating a reaction force on a road surface based upon at least one of said motor current value and said steering torque.

2. A control unit for an electrical-motor-driven power steering apparatus according to claim 1, said control unit further comprising:
    a vehicle speed obtained based upon rotation of a wheel; and
    a steering angle obtained based upon rotation of the steering wheel,
    wherein said estimation means estimates a coefficient of friction on the road surface by comparing with a previously memorized standard value corresponding to said vehicle speed and said steering angle.

3. A control unit for an electrical-motor-driven power steering apparatus according to claim 2, wherein said estimation means estimates a coefficient of friction on the road surface when said vehicle speed exists within a predetermined vehicle speed range and when said steering angle exists within a predetermined steering angle range.

4. A control unit for an electrical-motor-driven power steering apparatus according to claim 2, said control unit further comprising:
    a control means for controlling said motor based upon the estimated coefficient of friction on the road surface.

5. A control unit for an electrical-motor-driven power steering apparatus according to claim 4, wherein said estimation means respectively estimates coefficient of friction on the road surface corresponding to a right-steering operation and a left-steering operation.

6. A control unit for an electrical-motor-driven power steering apparatus according to claim 4, said control unit further comprising:
an abnormal detection means for judging whether the estimated coefficient of friction on the road surface is abnormal or not.

7. A control unit for an electrical-motor-driven power steering apparatus according to claim 6, said control unit further comprising:
a storing means for storing a formal coefficient of friction on the road surface before said abnormal detection means detects the abnormal value,
wherein said estimation means alternates a present coefficient of friction on the road surface to said formal coefficient of friction on the road surface stored in said storing means when said abnormal detection means judges that the present coefficient of friction on the road surface estimated in said estimation means is the abnormal value.

8. A control unit for an electrical-motor-driven power steering apparatus according to claim 2, wherein said estimation means executes a leveling processing taking account into the previously estimated coefficient of friction on the road surface when estimating the coefficient of friction on the road surface.

9. A control unit for an electrical-motor-driven power steering apparatus according to claim 8, said control unit further comprising:
an abnormal detection means for judging whether the estimated coefficient of friction on the road surface is abnormal or not.

10. A control unit for an electrical-motor-driven power steering apparatus according to claim 1, said control unit further comprising:
a vehicle speed obtained based upon rotation of a wheel; and
a steering angle obtained based upon rotation of the steering wheel,
wherein said estimation means estimates a coefficient of friction on the road surface when said vehicle speed exists within a predetermined vehicle speed range and when said steering angle exists within a predetermined steering angle range.

11. A control unit for an electrical-motor-driven power steering apparatus according to claim 10, said control unit further comprising:
a cotrol means for controlling said motor based upon the estimated coefficient of friction on the surface.

12. A control unit for an electrical-motor-driven power steering apparatus according to claim 10, wherein said estimation means executes a leveling processing taking account into the previously estimated coefficient of friction on the road surface when estimating the coefficient of friction on the road surface.

* * * * *